(12) United States Patent
Kim et al.

(10) Patent No.: US 11,657,802 B2
(45) Date of Patent: *May 23, 2023

(54) UTILIZING A DYNAMIC MEMORY NETWORK FOR STATE TRACKING

(71) Applicant: Adobe Inc., San Jose, CA (US)

(72) Inventors: Seokhwan Kim, San Jose, CA (US); Walter Chang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 17/135,629

(22) Filed: Dec. 28, 2020

(65) Prior Publication Data

US 2021/0118430 A1    Apr. 22, 2021

Related U.S. Application Data

(63) Continuation of application No. 16/135,957, filed on Sep. 19, 2018, now Pat. No. 10,909,970.

(51) Int. Cl.

| | |
|---|---|
| *G10L 21/00* | (2013.01) |
| *G10L 25/00* | (2013.01) |
| *G10L 15/16* | (2006.01) |
| *G06F 16/9032* | (2019.01) |
| *G10L 15/22* | (2006.01) |
| *H04L 51/02* | (2022.01) |

(52) U.S. Cl.
CPC ........ *G10L 15/16* (2013.01); *G06F 16/90332* (2019.01); *G10L 15/22* (2013.01); *H04L 51/02* (2013.01)

(58) Field of Classification Search
None
See application file for complete search history.

(56) References Cited

U.S. PATENT DOCUMENTS

| | | |
|---|---|---|
| 6,073,102 A | 6/2000 | Block |
| 8,160,879 B2 | 4/2012 | Czahor |
| 8,918,321 B2 | 2/2014 | Czahor |

(Continued)

FOREIGN PATENT DOCUMENTS

WO    WO 2017/223010 A1    12/2017

OTHER PUBLICATIONS

Examination Report as received in United Kingdom Application GB1909236.0 dated Jul. 26, 2021.

(Continued)

*Primary Examiner* — Satwant K Singh
(74) *Attorney, Agent, or Firm* — Keller Preece PLLC

(57) ABSTRACT

The present disclosure relates to generating digital responses based on digital dialog states generated by a neural network having a dynamic memory network architecture. For example, in one or more embodiments, the disclosed system provides a digital dialog having one or more segments to a dialog state tracking neural network having a dynamic memory network architecture that includes a set of multiple memory slots. In some embodiments, the dialog state tracking neural network further includes update gates and reset gates used in modifying the values stored in the memory slots. For instance, the disclosed system can utilize cross-slot interaction update/reset gates to accurately generate a digital dialog state for each of the segments of digital dialog. Subsequently, the system generates a digital response for each segment of digital dialog based on the digital dialog state.

20 Claims, 14 Drawing Sheets

(56) References Cited

U.S. PATENT DOCUMENTS

| | | |
|---|---|---|
| 9,741,340 B2 | 8/2017 | Czahor |
| 10,186,259 B2 | 1/2019 | Czahor |
| 10,540,967 B2 | 1/2020 | Perez |
| 10,609,216 B1 | 3/2020 | Banerjee |
| 10,909,970 B2 * | 2/2021 | Kim .................. H04L 51/02 |
| 11,449,744 B2 * | 9/2022 | Chen .................. G10L 15/1822 |
| 2017/0372200 A1 | 12/2017 | Chen et al. |
| 2019/0228763 A1 | 7/2019 | Czarnowski et al. |
| 2020/0043468 A1 | 2/2020 | Willett et al. |
| 2020/0117956 A1 | 4/2020 | Wayne et al. |

OTHER PUBLICATIONS

Examination Report as received in Australian application 2019204399 dated Aug. 13, 2021.

Examination Report as received in United Kingdom Application GB1909236.0 dated Mar. 30, 2021.

M. Nakano, N. Miyazaki, J. Hirasawa, K. Dohsaka and T. Kawabata, "Understanding unsegmented user utterances in realtime spoken dialogue systems," in ACL, 1999.

Z. Wang and O. Lemon, "A simple and generic belief tracking mechanism for the dialog state tracking challenge: On the believability of observed information," in SIGdial Conf on Discourse and Dialogue, Metz, France, 2013.

F. Dernoncourt, J. Y. Lee, T. H. Bui and H. H. Bui, "Robust dialog state tracking for large ontologies," in Dialogues with Social Robots, Singapore, Springer, 2017, pp. 475-485.

J. D. Williams and S. Young, "Partially observable markov decision processes for spoken dialog systems," Computer Speech & Language, 21(2):393-422., vol. 21, No. 2, pp. 393-422, 2007.

J. D. Williams, "Incremental partition recombination for efficient tracking of multiple dialog states," in IEEE International Conference on Acoustics Speech and Signal Processing (ICASSP), 2010.

S. Young, M. Gasic, S. Keizer, F. Mairesse, J. Schatzmann, B. Thomson and K. Yu, "The hidden information state model: A practical framework for pomdp-based spoken dialogue management," Computer Speech & Language, vol. 24, No. 2, pp. 150-174, 2010.

D. Bohus and A. Rudnicky, "A "K-hypotheses+Other" belief updating model," in AAAI Workshop on Statistical and Empirical Methods in Spoken Dialogue Systems, 2006.

S. Lee and M. Eskenazi, "Recipe for building robust spoken dialog state trackers: Dialog state tracking challenge system description," in SIGDIAL, 2013.

L. Zilka, D. Marek, M. Korvas and F. Jurcicek, "Comparison of bayesian discriminative and generative models for dialogue state tracking," in SIGDIAL, 2013.

M. Henderson, B. Thomson and S. Young, "Robust Dialog State Tracking Using Delexicalised Recurrent Neural Networks and Unsupervised Adaptation," in IEEE Workshop on Spoken Language Technologies (SLT), South Lake Tahoe, Nevada, 2014.

H. Shi, T. Ushio, M. Endo, K. Yamagami and N. Horii, "Convolutional neural networks for multi-topic dialog state tracking.", in Dialogues with Social Robots, Singapore, Springer, 2017, pp. 451-463.

T. Hori, H. Wang, C. Hori, S. Watanabe, B. Harsham, J. Le Roux, J. R. Hershey, Y. Koji, Y. Jing, Z. Zhu and T. Aikawa, "Dialog state tracking with attention-based sequence-tosequence learning," in IEEE Spoken Language Technology Workshop (SLT), San Diego, 2016.

M. Henaff, J. Weston, A. Szlam, A. Bordes and Y. LeCun, "Tracking the world state with recurrent entity networks," CoRR abs/1612.03969. http://arxiv.org/abs/1612.03969, 2016.

S. Hochreiter and J. Schmidhuber, "Long short-term memory," Neural computation, vol. 9, No. 8, pp. 1735-1780, 1997.

K. Cho, B. van Merrienboer, D. Bahdanau and Y. Bengio, "On the Properties of Neural Machine Translation: Encoder-Decoder Approaches," in Eighth Workshop on Syntax, Semantics and Structure in Statistical Translation (SSST-8), 2014.

S. Kim, L. F. D'Haro, R. E. Banchs, J. D. Williams and M. Henderson, "The fourth dialog state tracking challenge," in Dialogues with Social Robots, Singapore, Springer, 2017, pp. 435-449.

P. H. Adams and C. H. Martell. 2008. Topic detection and extraction in chat. In Proceedings of the 2008 IEEE International Conference on Semantic Computing, pp. 581-588.

D. Beeferman, A. Berger, and J. Lafferty. 1999. Statistical models for text segmentation. Machine learning, 34(1-3):177-210.

D. Bohus and A. Rudnicky. 2003. Ravenclaw: dialog management using hierarchical task decomposition and an expectation agenda. In Proceedings of the European Conference on Speech, Communication and Technology, pp. 597-600.

A. Celikyilmaz, D. Hakkani-Tur, and G. Tur. 2011. Approximate inference for domain detection in spoken language understanding. In Proceedings of the 12th Annual Conference of the International Speech Communication Association (INTERSPEECH), pp. 713-716.

R. Collobert, J. Weston, L. Bottou, M. Karlen, K. Kavukcuoglu, and P. Kuksa. 2011. Natural Tanguage processing (almost) from scratch. The Journal of Machine Learning Research, 12:2493-2537.

Y. Esteve, M. Bouallegue, C. Lailler, M. Morchid, R. Dufour, G. Linares, D. Matrouf, and R. De Mori. 2015. Integration of word and semantic features for theme identification in telephone conversations. In Natural Language Dialog Systems and Intelligent Assistants, pp. 223-231. Springer.

A. Graves, G. Wayne, and I. Danihelka. 2014. Neural turing machines. CoRR, abs/1410.5401.

A. Graves, G. Wayne, M. Reynolds, T. Harley, I. Danihelka, A. Grabska-Barwinska, S. G. Colmenarejo, E. Grefenstette, T. Ramalho, J. Agapiou, et al. 2016. Hybrid computing using a neural network with dynamic external memory. Nature, 538(7626):471.

S. Ikeda, K. Komatani, T. Ogata, H. G. Okuno, and H. G. Okuno. 2008. Extensibility verification of robust domain selection against out-of-grammar utterances in multi-domain spoken dialogue system. In Proceedings of the 9th INTERSPEECH, pp. 487-490.

N. Kalchbrenner, E. Grefenstette, and P. Blunsom. 2014. A convolutional neural network for modelling sentences. In Proceedings of the 52nd Annual Meeting of the Association for Computational Linguistics (vol. 1: Long Papers), pp. 655-665.

S. Kim, R. Banchs, and H. Li. 2016a. Exploring convolutional and recurrent neural networks in sequential labelling for dialogue topic tracking. In Proceedings of the 54th Annual Meeting of the Association for Computational Linguistics (vol. 1: Long Papers), pp. 963-973.

S. Kim, R. E. Banchs, and H. Li. 2014. A composite kernel approach for dialog topic tracking with structured domain knowledge from wikipedia. In Proceedings of the 52nd Annual Meeting of the Association for Computational Linguistics (vol. 2: Short Papers), pp. 19-23.

Y. Kim. 2014. Convolutional neural networks for sentence classification. In Proceedings of the 2014 Conference on Empirical Methods in Natural Language Processing (EMNLP), pp. 1746-1751.

D. P. Kingma and J. Ba. 2014. Adam: A method for stochastic optimization. CoRR, abs/1412.6980.

K. Lagus and J. Kuusisto. 2002. Topic identification in natural language dialogues using neural networks. In Proceedings of the 3rd SIGdial workshop on Discourse and dialogue, pp. 95-102.

C. Lee, S. Jung, and G. G. Lee. 2008. Robust dialog management with n-best hypotheses using dialog examples and agenda. In Proceedings of the 46th Annual Meeting of the Association for Computational Linguistics: Human Language Technologies, pp. 630-637.

J. Y. Lee and F. Dernoncourt. 2016. Sequential short-text classification with recurrent and convolutional neural networks. In Proceedings of the 2016 Conference of the North American Chapter of the Association for Computational Linguistics: Human Language Technologies, pp. 515-520.

B. Lin, H. Wang, and L. Lee. 1999. A distributed architecture for cooperative spoken dialogue agents with coherent dialogue state and history. In Proceedings of the IEEE Automatic Speech Recognition and Understanding Workshop (ASRU).

(56) References Cited

OTHER PUBLICATIONS

T. Mikolov, M. Karafiat, L. Burget, J. Cernocky, and S. Khudanpur. 2010. Recurrent neural network based language model. In INTERSPEECH, vol. 2, p. 3.
M. Morchid, R. Dufour, M. Bouallegue, G. Linares, and R. De Mori. 2014a Theme identification in human-human conversations with features from specific speaker type hidden spaces. In INTERSPEECH, pp. 248-252.
M. Morchid, R. Dufour, P.M. Bousquet, M. Bouallegue, G. Linares, and R. De Mori. 2014b. Improving dialogue classification using a topic space representation and a gaussian classifier based on the decision rule. In Acoustics, Speech and Signal Processing (ICASSP), 2014 IEEE International Conference on, pp. 126-130. IEEE.
T. Nakata, S. Ando, and A. Okumura. 2002. Topic detection based on dialogue history. In Proceedings of the 19th international conference on Computational linguistics (COLING), pp. 1-7.
L. Pevzner and M. A. Hearst. 2002. A critique and improvement of an evaluation metric for text segmentation. Computational Linguistics, 28(1):19-36.
L. A. Ramshaw and M. P. Marcus. 1995. Text chunking using transformation-based learning. In Proceedings of the 3rd Workshop on Very Large Corpus, pp. 88-94.
S. Roy and L. V. Subramaniam. 2006. Automatic generation of domain models for call centers from noisy transcriptions. In Proceedings of COLING/ACL, pp. 737-744.
Y. Shen, X. He, J. Gao, L. Deng, and G. Mesnil. 2014. Learning semantic representations using convolutional neural networks for web search. In Proceedings of the 23rd International Conference on World Wide Web (WWW), pp. 373-374. International World Wide Web Conferences Steering Committee.
A. Yeh. 2000. More accurate tests for the statistical significance of result differences. In Proceedings of the 18th conference on Computational linguistics—vol. 2, pp. 947-953.
W. Yih, X. He, and C. Meek. 2014. Semantic parsing for single-relation question answering. In Proceedings of the 52nd Annual Meeting of the Association for Computational Linguistics (ACL), pp. 643-648.
Henaff et al., "Tracking the World State with Recurrent Entity Networks", published May 10, 2017, arXiv:1612.03969v3. See whole document, especially figure 1.
Kumar et al., "Ask Me Anything: Dynamic Memory Networks for Natural Language Processing", published Mar. 5, 2016, arXiv:1506.07285v5. See whole document.
Cho et al., "Learning Phrase Representations using RNN EncoderDecoder for Statistical Machine Translation", published Sep. 3, 2014, arXiv:1406.1078v3. See especially section 2.3 and figure 2.
Combined Search and Examination Report as received in United Kingdom Application GB1909236.0 dated Dec. 13, 2019.
Examination Report as received in United Kingdom Application GB1909236.0 dated Dec. 8, 2020.
U.S. Appl. No. 16/135,957, May 14, 2020, Office Action.
U.S. Appl. No. 16/135,957, Sep. 28, 2020, Notice of Allowance.

* cited by examiner

| # | Speaker | Dialog Segment/Response | States |
|---|---|---|---|
| 1 | Assistant | How can I help you? | Topic: Open |
| 2 | User | Could you help me crop the top of this picture? | Topic: Crop }202<br>Location: Top |
| 3 | Assistant | Sure, is it okay with you? | |
| 4 | User | Um, a little bit higher till the black frame. | |
| 5 | Assistant | What about this? | |
| 6 | User | Yup, that's good! | |
| 7 | Assistant | Anything Else? | Topic: Adjustment }204<br>Type: Black and White |
| 8 | User | Let's black and white this picture. | |
| 9 | Assistant | Alright. | |
| 10 | User | Can you keep the contrast going down? I'll tell you when to stop. | Topic: Adjustment }206<br>Type: Contrast<br>Value: Decrease |
| 11 | Assistant | Okay. | |
| 12 | User | Right there! | |
| 13 | Assistant | Alright. | |
| 14 | User | I like this, can you post it to my FriendsNet account? | Topic: Export }208<br>Type: Social Media<br>Target: FriendsNet |
| 15 | Assistant | Okay, it has been uploaded! | |
| 16 | User | Great! Thanks! | |

*Fig. 2*

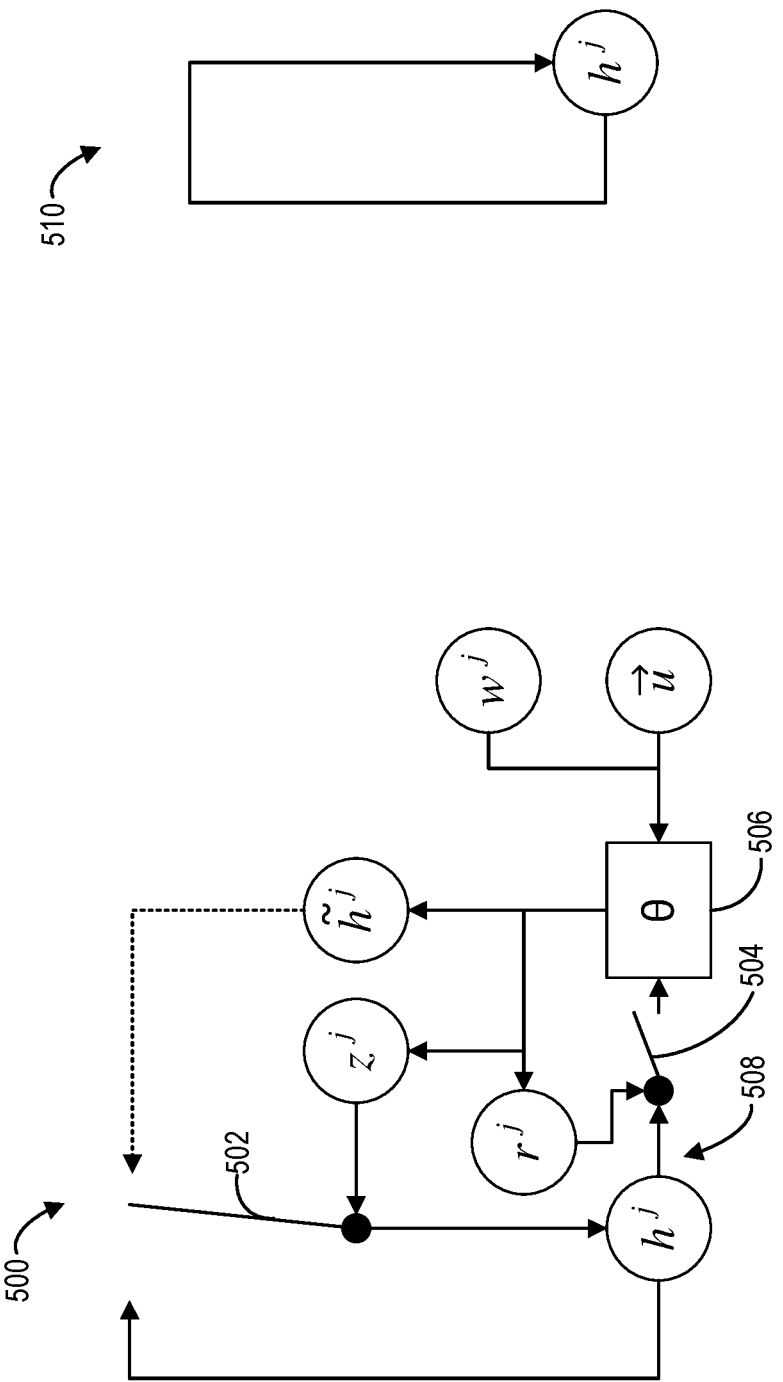

| Models | Topic Prediction | | | Segmentation | |
|---|---|---|---|---|---|
| | P | R | F | $P_k$ | WD |
| CNN | 0.6691 | 0.6861 | 0.6775 | 0.3799 | 0.4884 |
| RCNN | 0.6825 | 0.6572 | 0.6696 | 0.3970 | 0.4634 |
| RCNN with GRUs | 0.6936 | 0.6826 | 0.6880 | 0.3888 | 0.4619 |
| Memories with a single gate | 0.6877 | 0.7105 | 0.6989 | 0.3782 | 0.4393 |
| Memories with reset and update gates | 0.6959 | 0.7035 | 0.6997 | 0.3781 | 0.4427 |
| Memories with cross-slot interactions | 0.7008 | 0.7090 | 0.7049 | 0.3532 | 0.4223 |

*Fig. 9*

UTILIZING A DYNAMIC MEMORY NETWORK FOR STATE TRACKING

CROSS-REFERENCE TO RELATED APPLICATIONS

The present application is a continuation of U.S. application Ser. No. 16/135,957, filed on Sep. 19, 2018. The aforementioned application is hereby incorporated by reference in its entirety.

BACKGROUND

Recent years have seen significant improvements in hardware and software platforms that utilize artificial intelligence to facilitate dialog between a device and a user. For example, many modern devices provide a virtual assistant with which a user may engage to ask questions or perform search queries. Many of these dialog platforms employ systems to intelligently track the state of a dialog at any given point in order to determine a response that is relevant to a particular dialog segment (e.g., statement or question) in light of a surrounding context. For example, a dialog state tracking system may determine a current dialog state in light of a current dialog segment and its surrounding context. The system can then use the current dialog state to provide a response to the current dialog segment.

Although these conventional systems can track digital dialog states to provide digital responses, such systems have several technological shortcomings that result in inflexible, inaccurate, and inefficient operation. For example, conventional dialog state tracking systems are often inflexible in that they rigidly determine the current state of dialog corresponding to a current dialog segment without considering pertinent dialog segments that may be relevant to the current state. In particular, many conventional systems employ dialog state tracking models (e.g., neural network architectures, such as LSTMs and GRUs) that fail to retain pertinent information regarding previous segments of dialog. For example, as the models process new segments of dialog, they may continuously update their datastores with the new data corresponding to each segment. Consequently, the models tend to push out (i.e., "forget") the old, previously stored data, even if the data is still relevant. Therefore, when a user provides a new segment of dialog having a context that is informed by previous segments of dialog that preceded the new segment significantly, the models may not take these previous segments into consideration.

In addition to flexibility concerns, conventional dialog state tracking systems are also inaccurate. For example, conventional systems typically struggle to accurately determine digital dialog states. In particular, because conventional systems often employ models that struggle to retain pertinent information regarding old segments of dialog—even when relevant to the current state of dialog—such systems fail to generate digital dialog states that are based on all relevant information. Consequently, the conventional systems may generate a digital dialog state prediction that does not accurately reflect the true current state of dialog.

In addition to problems with flexibility and accuracy, conventional dialog state tracking systems are also inefficient. In particular, because the conventional systems often determine the digital dialog state inaccurately, such systems generally provide unhelpful responses to dialog segments, requiring additional user interactions to arrive at the correct response. For example, a conventional system may require a user to rephrase a statement or ask a different question (often many times) before providing the correct response. Due to increased interactions, such conventional systems often require additional computing resources (e.g., processing power and memory) in order to provide an appropriate response.

These, along with additional problems and issues, exist with regard to conventional dialog state tracking systems.

SUMMARY

One or more embodiments described herein provide benefits and/or solve one or more of the foregoing or other problems in the art with systems, methods, and non-transitory computer readable storage media that generate responses based on digital dialog states generated by a neural network having a dynamic memory network architecture. For example, in one or more embodiments, the disclosed systems provide a digital dialog having one or more segments (e.g., statements, questions, etc.) to a dialog state tracking neural network trained to generate digital dialog states. In particular, the dialog state tracking neural network can include a dynamic memory network architecture having a plurality of memory slots, each of which encodes a latent representation corresponding to an important subject of the dialog (e.g., topic, action to be taken, etc.). In one or more embodiments, the dialog state tracking neural network processes each segment of dialog to modify the values of one or more memory slots using a gating mechanism (e.g., a reset gate and an update gate). In some embodiments, the gating mechanism modifies the values of a memory slot based on cross-slot interactions between the memory slot and other memory slots utilizing the reset gate and the update gate. After processing each segment of digital dialog, the dialog state tracking neural network determines a digital dialog state based on the final slot values, and the disclosed systems generate a digital response to the segment based on the determined state. In this manner, the disclosed systems can flexibly, accurately, and efficiently generate digital responses that are based on all relevant information.

To illustrate, in one or more embodiments, a system can identify a digital dialog including a first segment and a second segment (e.g., two portions of a conversation). Subsequently, the system can provide the digital dialog to a dialog state tracking neural network that includes a dynamic memory network having a plurality of memory slots and a plurality of corresponding reset gates. The system can utilize the dialog state tracking neural network to generate a value for a memory slot based on the first segment and then utilize a reset gate associated with the memory slot to generate a new value for the memory slot based on the second segment. In some embodiments, the system also uses an update gate associated with the memory slot to generate the new value. In further embodiments, the system reset gate and the update gate are cross-slot interaction gates that function based on cross-slot interactions identified between memory slots in the dynamic memory network. After generating the new value, the system can generate a digital dialog state that corresponds to the second segment based on the new value of the memory slot. The system can then generate a digital response to the second segment based on the digital dialog state.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 2 illustrates an example exchange of dialog segments and responses in accordance with one or more embodiments;

FIGS. 5A-5D illustrate a schematic diagram of a dynamic memory unit having an update gate and a reset gate in accordance with one or more embodiments;

FIG. 9 illustrates a table reflecting experimental results regarding the effectiveness of the dialog state tracking system in accordance with one or more embodiments;

DETAILED DESCRIPTION

Figure 1:
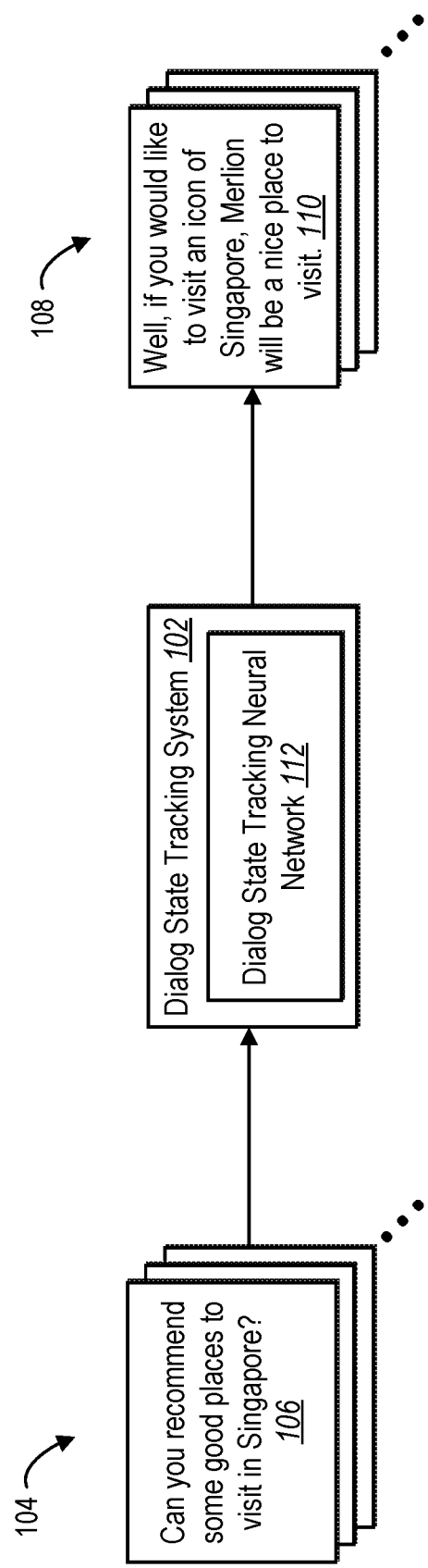
FIG. 1 illustrates a block diagram of the dialog state tracking system generating responses for segments of digital dialog in accordance with one or more embodiments.

One or more embodiments described herein include a dialog state tracking system that generates responses based on digital dialog states generated by a neural network having a dynamic memory network architecture. For instance, the dialog state tracking system can utilize a dialog state tracking neural network that generates digital dialog states based on values stored in a plurality of memory slots, which each encode a latent representation corresponding to an important subject of the dialog. The dialog state tracking neural network can generate the memory slot values by processing segments of digital dialog. In some embodiments, the dialog state tracking neural network generates the memory slot values using gating mechanisms (e.g., reset gates and update gates) that determine the impact of a current segment of dialog or previous segments of dialog. In some embodiments, the gating mechanisms further generate the values based on correlations between memory slots. The dialog state tracking neural network uses the memory slot values to generate digital dialog states, and the dialog state tracking system then uses those states to generate digital responses to the segments of dialog.

To provide an example, in one or more embodiments, the dialog state tracking system provides a digital dialog to a dialog state tracking neural network having a dynamic memory architecture that includes a plurality of memory slots and reset gates. The dialog state tracking system uses the neural network to generate a first value of a memory slot based on a first segment of the digital dialog. Subsequently, the dialog state tracking neural network utilizes a reset gate associated with the memory slot to generate a second value for the memory slot based on a second segment of the digital dialog. In some embodiments, the dialog state tracking neural network generates the second value of the memory slot by further using an update gate associated with the first memory slot. In some embodiments, the dialog state tracking neural network uses the reset gate and the update gate to generate the second value based on cross-slot interactions between the memory slot and other memory slots in the dynamic memory architecture. The dialog state tracking neural network generates a digital dialog state corresponding to the second segment of the digital dialog based on the second value of the memory slot. Using the digital dialog state, the dialog state tracking system can generate a digital response to the second segment.

As just mentioned, in one or more embodiments, the dialog state tracking system utilizes a dialog state tracking neural network having a dynamic memory network architecture to generate digital dialog states. In particular the dynamic memory network architecture provides a plurality of memory slots where each memory slot stores values indicative of a characteristic of a digital dialog state (i.e., encodes a latent representation of an important subject of the dialog). The dialog state tracking neural network utilizes the values of the plurality of memory slots to generate digital dialog states. When the dialog state tracking neural network processes a segment of digital dialog, the dialog state tracking neural network generates new values for one or more of the memory slots in order to generate a new digital dialog state corresponding to the segment.

Additionally, as mentioned above, the dialog state tracking neural network uses a plurality of reset gates associated with the plurality of memory slots to generate values for those memory slots. In one or more embodiments, the dialog state tracking neural network utilizes a reset gate associated with a memory slot to modify an impact of previous segments of digital dialog on the current values generated for that memory slot. For instance, the dialog state tracking neural network can utilize a reset gate to ignore a previous segment of digital dialog in determining a memory slot value for a subsequent segment of the digital dialog. In some embodiments, the dialog state tracking neural network utilizes the reset gate by determining a reset value and then applying the reset value to modify the impact of the previous segments of dialog.

In one or more embodiments, the dialog state tracking neural network further includes a plurality of update gates associated with the plurality of memory slots and the plurality of reset gates. In particular, the dialog state tracking neural network can use the plurality of update gates in generating values for the corresponding memory slots. For example, the dialog state tracking neural network can utilize an update gate associated with a memory slot to modify the impact of a current segment of digital dialog on the current values generated for the memory slot. In some embodiments, the dialog state tracking neural network utilizes the update gate by determining an update value and applying the update value to modify the impact of the current segment of digital dialog.

As further mentioned above, in one or more embodiments, the gates associated with each memory slot operate to determine the impact of segments of digital dialog (current or previous) further based on cross-slot interactions. In particular, a cross-slot interaction can include a correlation between one memory slot and another memory slot (e.g., when one memory slot changes another memory slot also changes). The dialog state tracking system can learn cross-slot interactions in training the dialog state tracking neural network and then generate values for a memory slot based on the interactions between that memory slot and every other available memory slot. For example, a reset gate can include a cross-slot interaction reset gate used to apply a cross-slot interaction reset value to modify the impact of previous segments of digital dialog on the current values generated for the memory slot. Further, an update gate can include a cross-slot interaction update gate used to apply a cross-slot interaction update value to modify the impact of the current segment of digital dialog on the current values generated for the memory slot.

The dialog state tracking system provides several advantages over conventional systems. For example, the dialog state tracking system improves the flexibility with which relevant data is considered when generating digital dialog states. In particular, by implementing a dialog state tracking neural network having a dynamic memory network architecture with multiple memory slots, the dialog state tracking system can generate digital dialog states based on all relevant previous segments of dialog. In particular, the dynamic memory network architecture allows relevant data stored in the memory slots to be maintained for long periods of time while also emphasizing relevant, newly-acquired data from digital dialog. Therefore, the dialog state tracking system can generate a current digital dialog state based on previous segments of digital dialog that significantly preceded the current segment if those previous segments are relevant to the current state. To illustrate, a virtual assistant helping a user to plan a trip to a particular location can store data relevant to the name of the location mentioned at the start of the dialog in order to recognize that, when the user asks for hotel recommendations several minutes later, the user specifically wants recommendations pertaining to that location. Further, by using cross-slot interaction update and reset gates, the dialog state tracking system can flexibly account for correlations between memory slots so that relevant changes to the data of one memory slot can impact the new values generated for another memory slot.

Further, the dialog state tracking system improves accuracy. In particular, by utilizing a dialog state tracking neural network having a dynamic memory architecture with multiple memory slots that can store relevant data for long periods of time, the dialog state tracking system can consider all relevant information when determining a digital dialog state. Additionally, by utilizing update gates and reset gates and generating new values based on cross-slot interactions between memory slots, the dialog state tracking system can more accurately determine dialog states and generate responses. To illustrate, a virtual assistant can more accurately follow a conversation with a user (e.g., what the conversation is currently about), because the virtual assistant can "remember" information it has determined is still relevant and "forget" information it has determined is irrelevant. Thus, the virtual assistant only considers relevant information when determining the state of dialog.

Additionally, by more accurately generating digital dialog states, the dialog state tracking system operates more efficiently. In particular, because the dialog state tracking system more accurately determines digital dialog states, the system can further generate digital responses that more accurately respond to a segment of digital dialog. This alleviates the need for additional interactions between the dialog state tracking system and a user before the system can provide an appropriate response. Due to this reduced need for additional interactions, the dialog state tracking system improves the efficiency of implementing computer systems by requiring less processing power and memory during operation. As an example, a virtual assistant can more accurately recognize that a request for hotel recommendations relates to a particular location mentioned previously in the dialog. Thus, the virtual assistant can provide the user with recommendations for the particular location without requiring the user to resubmit the request or rephrase the request to include the name of the particular location. Consequently, by providing an accurate answer the first time, the virtual assistant avoids using processing power that would be required to perform a subsequent effort.

As illustrated by the foregoing discussion, the present disclosure utilizes a variety of terms to describe features and benefits of the dialog state tracking system. Additional detail is now provided regarding the meaning of these terms. For example, as used herein, the term "digital dialog" refers to digital data reflecting a communication. In particular, digital dialog can include digital data representing communication between two or more systems or entities. To illustrate, a digital dialog can represent communication between a user (e.g., a person) and a device or communication between two devices. More specifically, a digital dialog can reflect an audio conversation (e.g., a conversation between human using a telephone device and an artificial intelligence response system), a text conversation (e.g., chat or text messaging between a client device and an artificial intelligence response system), or another conversation. Additionally, as used herein, the term "segment," "dialog segment," "digital dialog segment," or "segment of digital dialog" refers to a portion of digital dialog. In particular, a segment can refer to a subset of digital dialog containing the entirety of the digital dialog or less than the entirety of the digital dialog. To illustrate, a segment can include a statement or a question from a conversation.

Further, as used herein, the term "digital dialog state" or "dialog state" refers to a description of dialog. In particular, a digital dialog state can refer to a description of the characteristics of a dialog at a given point in time. For example, a digital dialog state can describe a current topic of the dialog, a type of dialog (e.g., a type of request), a subject or target (e.g., a target of a request), particular actions to be taken per instructions given by the dialog, or a location (e.g., a location for a request) or entity described by the dialog.

Additionally, as used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In addition, a neural network is an algorithm (or set of algorithms) that implements deep learning techniques that utilize a set of algorithms to model high-level abstractions in data. The term neural network can include dynamic memory networks. As used herein, the term "dynamic memory network" refers to a recurrent neural network architecture that utilizes a plurality of dynamic memory units and attention mechanisms in analyzing a particular stage of a sequence. As described in greater detail below, a dynamic memory unit can include a gating mechanism (e.g., reset gate and/or update gate), a memory slot, and an algorithm (e.g., content-based operation) for updating values for the memory slot based on input data at different stages of a sequence of events.

As used herein, the term "memory slot" refers to latent representation of a subject, topic, and/or characteristic of the digital dialog. In particular, the term memory slot includes a memory mechanism within a dynamic memory network that reflects a subject (e.g., via a latent feature vector). A plurality of memory slots within a dynamic memory network can collectively represent a latent dialog state. A memory slot can refer to a particular location in memory (e.g., a location in hardware storage) or a particular designation of a value stored in memory (e.g., any memory location that stores values for a particular dialog characteristic).

Further, as used herein, the term "reset gate" or "update gate" refers to a gating mechanism for generating values for a memory slot. In particular, the term reset gate can refer to a gating mechanism that modifies the impact of previous data (e.g., previous memory slot values) on the generation of new data (e.g., current memory slot values for a current segment of dialog). To illustrate, a reset gate can include a gating mechanism corresponding to a memory slot that modifies the impact of previous inputs on a current value to be stored in that memory slot. Similarly, as used herein, the term "update gate" can refer to a gating mechanism that modifies the impact of new data on the generation of new values. To illustrate, an update gate can include a gating mechanism corresponding to a memory slot that modifies the impact of a current input (e.g., a current dialog feature representation) on a current value to be stored in that slot.

Further, as used herein, the term "cross-slot interactions" refers to a mechanism for modifying memory slot values based on other memory slot values (e.g., in the same time step or item of a sequence). In particular, a cross-slot interaction includes a correlation between a memory slot and another memory slot that is part of the dynamic memory network. For example, a cross-slot interaction reset gate modifies the impact of previous inputs on the current values generated for a memory slot based on the correlations between that memory slot and every other memory slot. Similarly, a cross-slot interaction update gate modifies the impact of the current input on the current values generated for a memory slot based on such correlations.

Additionally, as used herein, the term "dialog feature representation" refers to a set of numeric values representing a digital dialog or dialog segment. In particular, the term dialog feature representation includes a feature vector generated utilizing a convolutional neural network that reflects latent and/or patent features of a dialog or dialog segment. In one or more embodiments, a dialog feature representation is a multi-dimensional dataset (e.g., matrix or vector) that represents dialog characteristics. In one or more embodiments, a dialog feature representation includes a set of numeric metrics learned by a machine learning algorithm such as convolutional layers of a dialog state tracking neural network.

Further, as used herein, the term "response" or "digital response" refers to a reaction to a segment of digital dialog. In particular, the term response includes a communicative reply or an action taken after receiving a segment of digital dialog. To illustrate, a response can include an answer to a question, a statement made in response to another statement, or an action taken per a request or instructions provided by one or more segments of digital dialog. A response can take the form of digital text, digital audio, or a performed action (e.g., cropping an image).

Additional detail regarding the dialog state tracking system will now be provided with reference to the figures. For example, FIG. 1 illustrates a block diagram for generating digital responses to segments of digital dialog in accordance with one or more embodiments. As shown in FIG. 1, the dialog state tracking system 102 uses a digital dialog 104 comprising one or more segments to generate a plurality of digital responses 108. It should be noted that the digital dialog 104 can comprise any number of segments and the dialog state tracking system 102 can produce any appropriate number of corresponding digital responses as part of the plurality of digital responses 108. In one or more embodiments, the dialog state tracking system generates a digital response for every segment of the digital dialog 104 (or all segments coming from a particular individual or source).

As an illustration, FIG. 1 shows the dialog state tracking system 102 obtaining a segment 106 of the digital dialog 104. In one or more embodiments, the segment 106 is provided to the dialog state tracking system 102 audibly (e.g., a user speaks the segment 106 or a device presents an audio representation of the segment 106). In some embodiments, the segment 106 is presented through written submission (e.g., a user submits a typed representation of the segment 106 using a computing device implementing the dialog state tracking system 102.) In further embodiments, the dialog state tracking system 102 otherwise identifies the digital dialog 104 and the included segments (e.g., accesses a recording or transcript stored on a database). As shown in FIG. 1, the segment 106 poses a question asking for a recommendation for a location to visit while travelling to Singapore.

As can be seen in FIG. 1, the dialog state tracking system 102 uses a segment 106 of the digital dialog 104 to generate a digital response 110 to the segment 106. In particular, FIG. 1 shows that the dialog state tracking system 102 employs a dialog state tracking neural network 112 in generating the digital response 110. More specifically, the dialog state tracking neural network 112 generates digital dialog states, which are used by the dialog state tracking system 102 to generate digital responses as will be discussed in more detail below. As illustrated by FIG. 1, the digital response 110 is an answer to the question posed by the segment 106 of the digital dialog 104, providing a location recommendation as requested.

FIG. 2 illustrates an example exchange of dialog segments and digital responses as well as corresponding digital dialog states in accordance with one or more embodiments. In particular, the figure illustrates a dialog between a user (e.g., a person) referred to as "User" and the dialog state tracking system referred to here as "Assistant." More specifically, the dialog includes a request by the user for a photo to be edited and posted to a social media account.

As shown in FIG. 2, in one or more embodiments, the dialog state tracking system works in collaboration with another system to perform a user request, to retrieve an answer to a user question, etc. For example, as shown in FIG. 2, the dialog state tracking system can work in collaboration with a photo editing system to edit a photo as requested by the user. To illustrate, the user can provide a segment of dialog requesting that the photo editing system crop a selected photo. The dialog state tracking system can receive the segment of dialog and determine the current digital dialog state. The photo editing system can then crop the selected photo based on the digital dialog state and the dialog state tracking system can subsequently generate a digital response informing the user that the action has been performed.

As can be seen in FIG. 2, as the digital dialog progresses (i.e., as the user provides successive segments of dialog), the dialog state tracking system continuously determines the current digital dialog state. For example, when the user requests for the top of a photo to be cropped, the dialog state tracking system determines that the digital dialog state 202 includes a topic ("Crop") and a location ("Top"). Subsequently, when the user requests that the photo be changed to a black and white version, the dialog state tracking system determines that the digital dialog state 204 includes a new topic ("Adjustment") and a type ("Black & white").

As shown in FIG. 2, in some embodiments, a particular digital dialog state remains valid even after receiving a new segment of digital dialog (e.g., the dialog state tracking system generates a digital dialog state that is the same as the previous digital dialog state). For example, the dialog state tracking system maintains the digital dialog states 202, 206, and 208 through multiple segments of digital dialog received from the user. However, the dialog state tracking system can change the digital dialog state with each new segment of digital dialog as needed. For example, the dialog state tracking system changed the digital dialog state from the digital dialog state 204 to the digital dialog state 206 as soon as the user provides the next segment asking for a change to the contrast of the photo.

Figure 3:
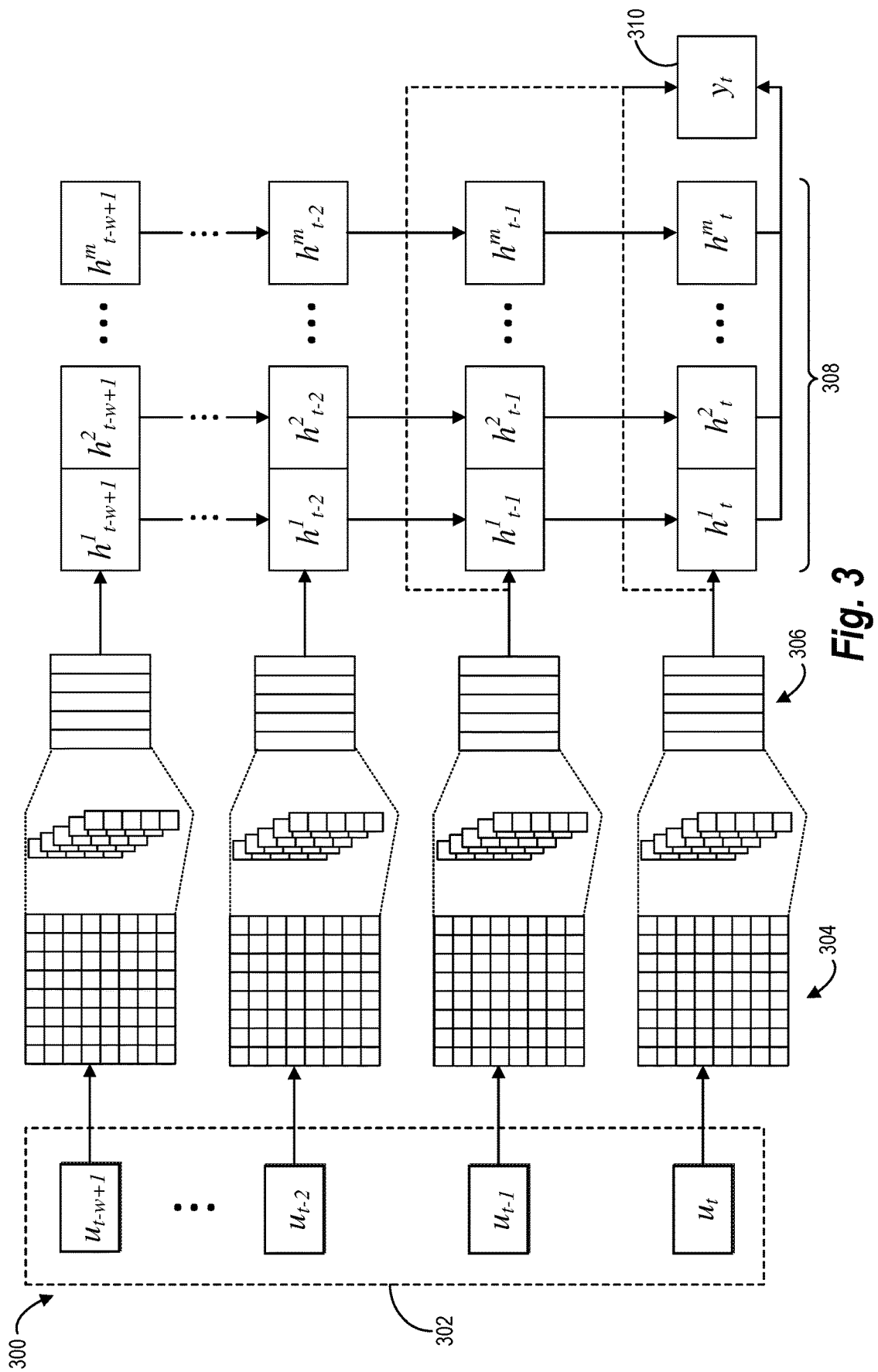
FIG. 3 illustrates a schematic diagram of a dynamic memory network architecture of a dialog state tracking neural network trained to generate digital dialog states in accordance with one or more embodiments.

As mentioned above, in some embodiments, the dialog state tracking system utilizes a dialog state tracking neural network to generate digital dialog states, which are used in generating digital responses. In particular, in one or more embodiments, the dialog state tracking neural network includes a dynamic memory network architecture. FIG. 3 illustrates a schematic of the dynamic memory network architecture of a dialog state tracking neural network 300 used by one or more embodiments of the dialog state tracking system to generate digital dialog states. While FIG. 3 provides a broad overview of the dialog state tracking neural network 300, more detail regarding the network and its architecture will be provided below with reference to FIGS. 4A-6.

As shown in FIG. 3, the dialog state tracking neural network 300 can take a sequence of digital dialog segments (e.g., utterances) from $u_{t-w+1}$ to $u_t$ as the input 302 at time step t where w represents a history window. In other words, $u_t$ represents a current segment of digital dialog and the sequence from $u_{t-w+1}$ to $u_{t-1}$ represent previous segments of digital dialog within a selected time window that the dynamic memory network uses in determining the current digital dialog state (i.e., the digital dialog state at time t). In one or more embodiments, taking in the sequence of segments $u_{t-w+1}$ to $u_{t-1}$ as part of the input 302 includes processing the segment and storing resulting values in one or more of the memory slots before time t (e.g., processing the segment $u_{t-1}$ at time t−1 and storing resulting values in the corresponding memory slots, etc.). As can be seen in FIG. 3, and as will be discussed in more detail below, the values of a memory slot at time t−1 can be used in generating the new values for the memory slot at time t. In other words, the values generated by processing previous segments of digital dialog can impact the current values obtained by processing the current segment of digital dialog. Thus, the sequence of segments (e.g., utterances) $u_{t-w+1}$ to $u_{t-1}$ become part of the input 302 for generating values for the memory slots (and, consequently, for generating a digital dialog state) at time t.

In particular, the dialog state tracking neural network 300 utilizes an embedded convolutional neural network to generate a dialog feature representation for a current dialog segment. In one or more embodiments, the dialog state tracking neural network 300 utilizes the embedded convolutional neural network to generate dialog feature representations as described by Y. Kim, "Convolutional Neural Networks for Sentence Classification," in *EMNLP*, 2014, which is incorporated herein by reference in its entirety. The dialog state tracking neural network 300 then analyzes the dialog feature representation together with values (i.e., latent feature vectors) from previous memory slots to generate new values for the memory slots. The memory slots are then utilized to generate state predictions for the current dialog segment.

More specifically, in relation to the embodiment of FIG. 3, the dialog state tracking neural network 300 represents a segment of digital dialog having n words as an n×k input matrix by concatenating vectors, each of which is a k-dimensional word embedding $\vec{x}_i \in \mathbb{R}^k$ representing the i-th word in the segment. Using convolutional layers (e.g., the convolutional layers 304) the dialog state tracking neural network 300 applies, to the input matrix, a filter $\mathcal{F} \in \mathbb{R}^{k \times m}$ with the same width k as the input matrix and a given height m to generate the following convolutional feature at the i-th position:

$$c_i = \sigma(\mathcal{F} \cdot \vec{x}_{i:i+m-1} + b) \quad (1)$$

In equation 1, $\vec{x}_{i:j}$ represents the sub-region from the i-th row to the j-th row in the input matrix, $b \in \mathbb{R}$ is a bias term, and σ represents a non-linear activation function (e.g., rectified linear units). A series of convolutional operations using equation 1 while sliding over from the first row of the input matrix to the (n−m+1)-th row produces a convolutional feature map $\vec{c} = [c_1 \ldots c_{n-m+1}] \in \mathbb{R}^{n-m+1}$ for the filter $\mathcal{F}$. Then, the maximum element c'=max (c) is selected from each convolutional feature map and considered as the most important feature for the particular filter in the respective max-pooling layers (e.g., the max pooling layers 306).

Using the max pooling layers (e.g., the max pooling layers 306), the dialog state tracking neural network 300 generates a dialog feature representation (e.g., feature vector) $\vec{u}_t \in \mathbb{R}^l$, which is an l-dimensional vector representation of the respective segment of digital dialog where l is the total number of filters used in the convolutional layers. The dialog state tracking neural network 300 then provides the dialog feature representation $\vec{u}_t$ to the dynamic memories layer (e.g., the dynamic memories layer 308), which uses one or more dynamic memory units to produce a latent feature vector for each memory slot j. The dynamic memory units will be discussed in more detail below with reference to FIGS. 4A-6. Each memory slot j stores the latent feature vector as one or more values that encode a latent representation corresponding to an important subject of the digital dialog. For example, a first memory slot can store values that correspond to a topic of digital dialog and a second memory slot can store values that correspond to an action to be taken per instructions provided by the digital dialog.

When processing a current segment of digital dialog, the dialog state tracking neural network 300 routes the values previously held in each memory slot $h_{t-1}^j$ to a corresponding dynamic memory unit, which can use the previously held values of that memory slot (along with the dialog feature representation $\vec{u}_t$ generated from the current segment of digital dialog and a corresponding key vector $w^j$) in generating the current latent feature vector $h_t^j$ to be stored in that memory slot. By routing the previously held values of each memory slot to the corresponding dynamic memory unit for generating the current values, the dialog state tracking system 300 enables previous segments of digital dialog to impact the current digital dialog state. In other words, the impact of the previous segments of digital dialog $u_{t-w+1}$ to $u_{t-1}$ on the current digital dialog state is provided as the previous values held by the memory slots are used in determining the current values for the memory slots. In one or more embodiments, generating current values for a memory slot includes overwriting the previous values of the memory slot in a memory location designated for that memory slot. In some embodiments, generating the current values includes storing the current values in a different memory location and designating that new memory location as the memory slot.

As can be seen in FIG. 3, after generating the current values for each memory slot, the dialog state tracking neural network 300 uses a prediction layer 310 to generate a current digital dialog state. In particular, the dialog state tracking neural network 300 provides the current values of each memory slot, the current dialog feature representation $\vec{u}_t$ (generated by processing the current segment of digital dialog $u_t$ via the convolution layers 304) and the previous dialog feature representation $\vec{u}_{t-1}$ (generated by processing the previous segment of digital dialog $u_{t-1}$ via the convolution layers 304) to the prediction layer 310 to generate the digital dialog state. In one or more embodiments, the prediction layer 310 includes a softmax classifier.

As mentioned, the dialog state tracking neural network 300 uses a dynamic memory unit corresponding to each memory slot to generate the current values (i.e., latent feature vector) for that memory slot. FIGS. 4A-6 provide more detail with regard to dynamic memory units utilized by one or more embodiments. In particular, it can be seen in FIGS. 4A-6 that the dialog state tracking neural network 300 uses memory units that include a gating mechanism to determine what data gets used in generating the latent feature vectors to be stored as values in the corresponding memory slots.

Figure 4C:
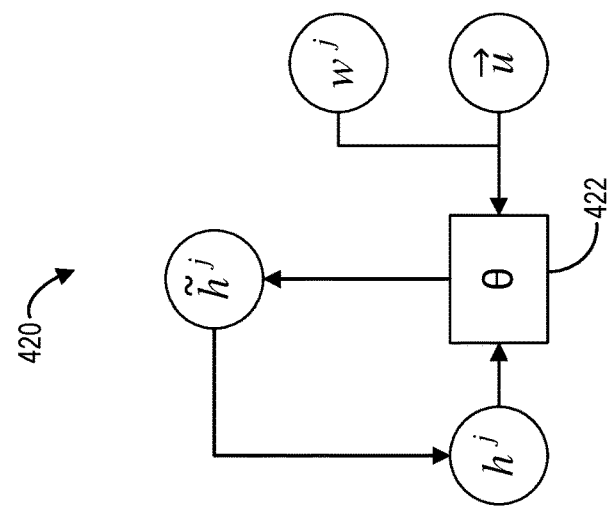
FIGS. 4A-4C illustrate a schematic diagram of a dynamic memory unit having a single update gate in accordance with one or more embodiments.
Figure 4B:
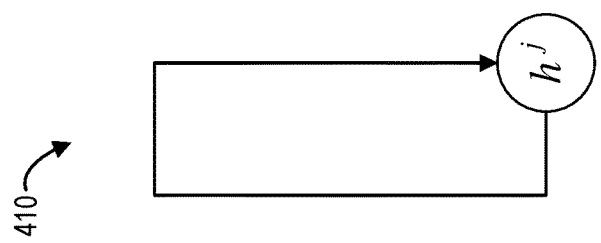
Figure 4A:
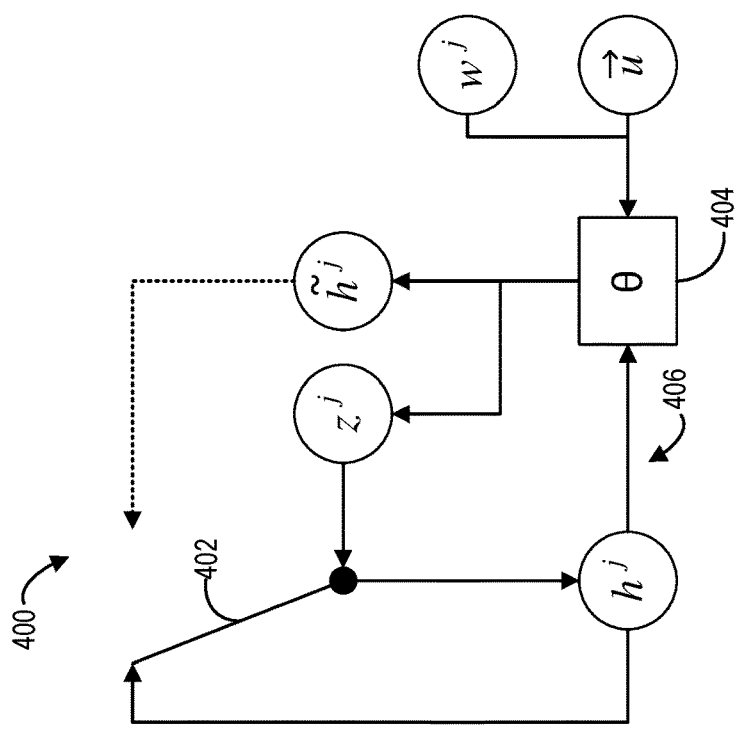

FIG. 4A illustrates a dynamic memory unit 400 with an update gate 402 in accordance with one or more embodiments. In particular, FIG. 4A illustrates the inputs and functions used by the dynamic memory unit 400 in generating values for the j-th memory slot at the i-th time step. In particular, θ represents one or more (update) functions 404 with trainable parameters that analyze the collection of inputs as part of the dynamic memory unit 400. For example, in relation to FIG. 4, θ can represent equation 2 and/or trainable parameters for generating update values, such as $z_i^j$. In one or more embodiments, the dialog state tracking system 102 generates update (or reset) values utilizing an update (or reset) function as described by M. Henaff, J. Weston, A. Szlam, A. Bordes, and Y. LeCun in *Tracking the World State With Recurrent Entity Networks*, ICLR 2017, CoRR abs/1612.03969. http://arxiv.org/abs/1612.03969, which is incorporated herein by reference in its entirety.

It should be noted that the arrow 406 represents that $h^1$ is provided as part of the collection of inputs when generating values for the memory slot in the next time step (i.e., after receiving the next segment of digital dialog). In other words, when generating values for the j-th memory slot at the i-th time step, the arrow 406 represents that the previous values $h_{i-1}^j$ are provided as input to the function 404.

The dynamic memory unit 400 generates the values for the j-th memory slot at the i-th time step, using the following:

$$z_i^j = \sigma(\vec{u}_i^T w^j + \vec{u}_i^T h_{i-1}^j) \quad (2)$$

$$\tilde{h}_i^j = \tanh(U h_{i-1}^j + V w^j + W \vec{u}_i) \quad (3)$$

$$h_i^j = (1 - z_i^j) \cdot h_{i-1}^j + z_i^j \cdot \tilde{h}_i^j \quad (4)$$

In the above equations, $z_i^j$ represents an update value, $w^j$ is a trainable key vector, $\tilde{h}_i^j$ represents candidate values, and the parameters U, V, W are shared across all memory slots. It should be noted that, as shown in equation 2, the update value $z_i^j$ depends on two terms $\vec{u}_i^T w_j$ and $\vec{u}_i^T h_{i-1}^j$ which represents that the update value is controlled by a correspondence between the dialog feature representation $\vec{u}_i$ and the key vector and the previous values $h_{i-1}^j$ of the memory slot, respectively. In other words, the previous values $h_{i-1}^j$ and the key vector act as an activation signal, controlling whether the segment of dialog "activates" the j-th memory slot (i.e., determines whether the memory slot will be updated or the degree to which the memory slot will be updated with the new information).

Upon generation of the update value $z_i^j$ using equation 2, the dynamic memory unit 400 applies the update value to the update gate 402. In particular the update gate 402 controls the degree to which the candidate values $\tilde{h}_i^j$ impact the current values $h_i^j$ as seen in equation 4. Because the candidate values $\tilde{h}_i^j$ incorporate the dialog feature representation $\vec{u}_i$ generated by processing the current segment of digital dialog as shown in equation 3, the update gate 402 controls the degree to which the current segment of digital dialog impacts the current values $h_{i-1}^j$. In other words, application of the update value $z_i^j$ modifies the impact of the current segment of digital dialog to the current values $h_i^j$.

FIGS. 4B-4C each illustrate a schematic of a dynamic memory unit corresponding to the dynamic memory unit 400 when the update gate 402 is positioned in accordance with the update value $z_i^j$. For example, FIG. 4B illustrates the memory unit 410 corresponding to a positioning of the update gate 402 when the update value $z_i^j=0$. As illustrated in FIG. 4B and as seen from equation 4, when $z_i^j=0$, the memory unit 410 generates the current values $h_i^j$ based entirely on the previous values $h_{i-1}^j$ of the memory slot. In other words, when $z_i^j=0$, the simplified memory unit 410 does not update the values of the memory slot with new information obtained from the current segment of digital dialog.

Similarly, FIG. 4C illustrates the simplified memory unit 420 corresponding to a positioning of the update gate 402 when the update value $z_i^j=1$. As can be seen in FIG. 4C and from equation 4, when $z_i^j=1$, the simplified memory unit 420 generates the current values $h_i^j$ based entirely on the candidate values $\tilde{h}_i^j$. Because the candidate values $\tilde{h}_i^j$ incorporate the collection of inputs 422, the simplified memory unit 420 updates the values of the memory slot based on the previous values $h_{i-1}^j$ of the memory slot, the key vector $w^j$ corresponding to the memory slot, and the dialog feature representation $\vec{u}_i$ generated by processing the current segment of digital dialog.

It should be noted that FIGS. 4B-4C illustrate a position of the update gate 402 corresponding to the extreme values available to the update value $z_i^j$. However, as shown by equation 2, $z_i^j$ can have any value between 0 and 1. Consequently, the dialog state tracking system 102 applying the update gate 402 so that the current values for a memory slot $h_i^j$ can be generated based partly on both the previous values of the memory slot $h_{i-1}^j$ and the candidate values $\tilde{h}_i^j$.

As mentioned above, the dialog state tracking system 102 can also utilize a dynamic memory unit with a reset gate. FIG. 5A illustrates a dynamic memory unit 500 with an update gate 502 and a reset gate 504 in accordance with one or more embodiments. In particular, FIG. 5A illustrates the inputs and functions used by the dynamic memory unit 500 in generating values for the j-th memory slot at the i-th time step. As mentioned, θ represents one or more update/reset functions 506 with trainable parameters that analyze the collection of inputs 506 as part of the dynamic memory unit 500 (e.g., Equation 2 discussed above and/or Equation 5 discussed below).

It should be noted that, as with the arrow 406 of the dynamic memory unit 400 shown in FIG. 4A, the arrow 508 represents that the previous values $h_{i-1}^j$ can be provided as part of the collection of inputs 506 when generating values for the j-th memory slot at the i-th time step; however, there is one key difference—the reset gate 504 controls whether (and to what degree) the previous values $h_{i-1}^j$ are used as part of the collection of inputs 506.

The dynamic memory unit 500 generates the values $h_i^j$ for the j-th memory slot at the i-th step with the following additional equations:

$$r_i^j = \sigma(\vec{u}_i^T W_r w^j + \vec{u}_i^T U_r h_{i-1}^j) \quad (5)$$

$$\tilde{h}_i^j = \tanh(U(r_i^j \cdot h_{i-1}^j) + V w^j + W \vec{u}_i) \quad (6)$$

In the above, $r_i^j$ represents a reset value and equation 6 modifies equation 3 to incorporate the reset value into the candidate values $\tilde{h}_i^j$. As with the update value $z_i^j$ in equation 2, the reset value $r_i^j$ depends on two terms $\vec{u}_i^T W_r w^j$ and $\vec{u}_i^T U_r h_{i-1}^j$ which represents that the reset value $r_i^j$ is controlled by a correspondence between the dialog feature representation $\vec{u}_i$ and the key vector $w^j$ and the previous values $h_{i-1}^j$ of the memory slot, respectively. Further, $W_r$ and $U_r$ are trainable transform parameters.

Upon generation of the update value $z_i^j$ using equation 2 and the reset value $r_i^j$ using equation 5, the dynamic memory unit 500 applies the update value $z_i^j$ at the update gate 502 and applies the reset value $r_i^j$ at the reset gate 504. In particular, the reset gate 504 controls the degree to which the previous values $h_{i-1}^j$ of a memory slot impact the candidate values $\tilde{h}_i^j$ as seen in equation 6. Because the previous values $h_{i-1}^j$ incorporate data obtained from previous segments of digital dialog and the candidate values $\tilde{h}_i^j$ can impact the current values $h_{i}^t$ (depending on the update value $z_i^j$ as shown in equation 5), the position of the reset gate 504 controls the degree to which previous segments of digital dialog impact the current values $h_{i}^j$. In other words, application of the reset value $r_i^j$ modifies the impact of the previous segments of digital dialog to the current values $h_i^j$ (i.e., the reset gate 504 can "reset" the memory slot by ignoring the previous values of that memory slot).

Figure 5D:
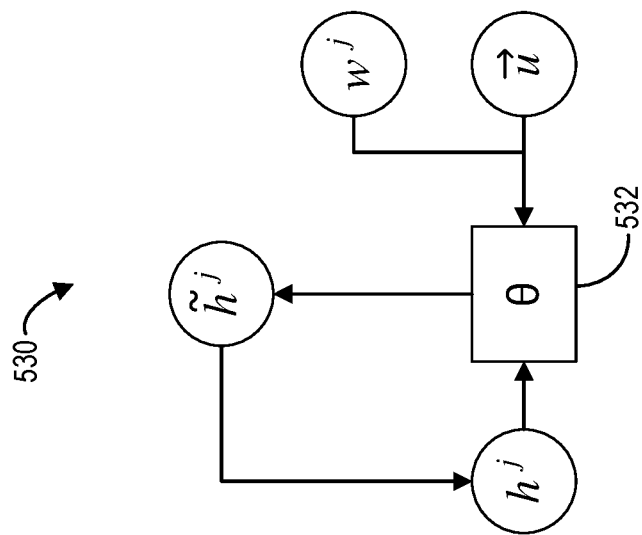
Figure 5C:
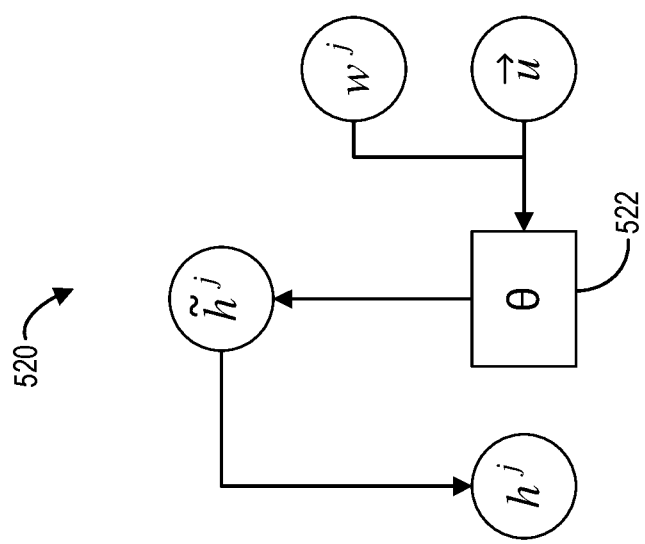

FIGS. 5B-5D each illustrate a schematic of a dynamic memory unit corresponding to the dynamic memory unit 500 when the update gate 502 is applied in accordance with the update value $z_i^j$ and the reset gate 504 is applied in accordance with the reset value $r_i^j$. For example, FIG. 5B illustrates the simplified memory unit 510 corresponding to the update gate 502 when the update value $z_i^j = 0$. As illustrated in FIG. 5B and as seen from equation 4, when $z_i^j = 0$, the simplified memory unit 510 generates the current values $h_i^j$ based entirely on the previous values $h_{i-1}^j$ of the memory slot. In other words, when $z_i^j = 0$, the simplified memory unit 510 does not update the values of the memory slot with new information obtained from the current segment of digital dialog.

FIG. 5C illustrates the simplified memory unit 520 for the update gate 502 when the update value $z_i^j = 1$ and for the reset gate 504 when the reset value $r_i^j = 0$. As can be seen in FIG. 5C and from equation 6, when $r_i^j = 0$, the candidate values $\tilde{h}_i^j$ do not incorporate the previous values $h_{i-1}^j$. Accordingly, the collection of inputs 522 used to generate the candidate values $\tilde{h}_i^j$ include the key vector $w^j$ corresponding to the memory slot and the dialog feature representation $\vec{u}_i$ generated by processing the current segment of digital dialog. In other words, the memory slot is "reset" (e.g., it does not take into consideration the previous values $h_{i-1}^j$).

FIG. 5D illustrates the simplified memory unit 530 corresponding to a positioning of the update gate when the update value $z_i^j = 1$ and a positioning of the reset gate 504 when the reset value $r_i^j = 1$. As can be seen in FIG. 5D and from equation 6, when $r_i^j = 1$, the candidate values $\tilde{h}_i^j$ do incorporate the previous values $h_{i-1}^j$. Accordingly, the collection of inputs 532 used to generate the candidate values $\tilde{h}_i^j$ include the previous values $h_{i-1}^j$ of the memory slot, the key vector $w^j$ corresponding to the memory slot, and the dialog feature representation $\vec{u}_i$ generated by processing the current segment of digital dialog.

It should be noted that FIGS. 5B-5D illustrate the update gate 502 and the reset gate 504 in relation to extreme values for the update value $z_i^j$ and the reset value $r_i^j$, respectively. However, as shown by the equations, $z_i^j$ and $r_i^j$ can have any value between 0 and 1. Consequently, the update gate 502 and the reset gate 504 can be positioned so that the current values for a memory slot $h_i^j$ can be generated based partly on both the previous values of the memory slot $h_{i-1}^j$ and the candidate values $\tilde{h}_i^j$.

Figure 6:
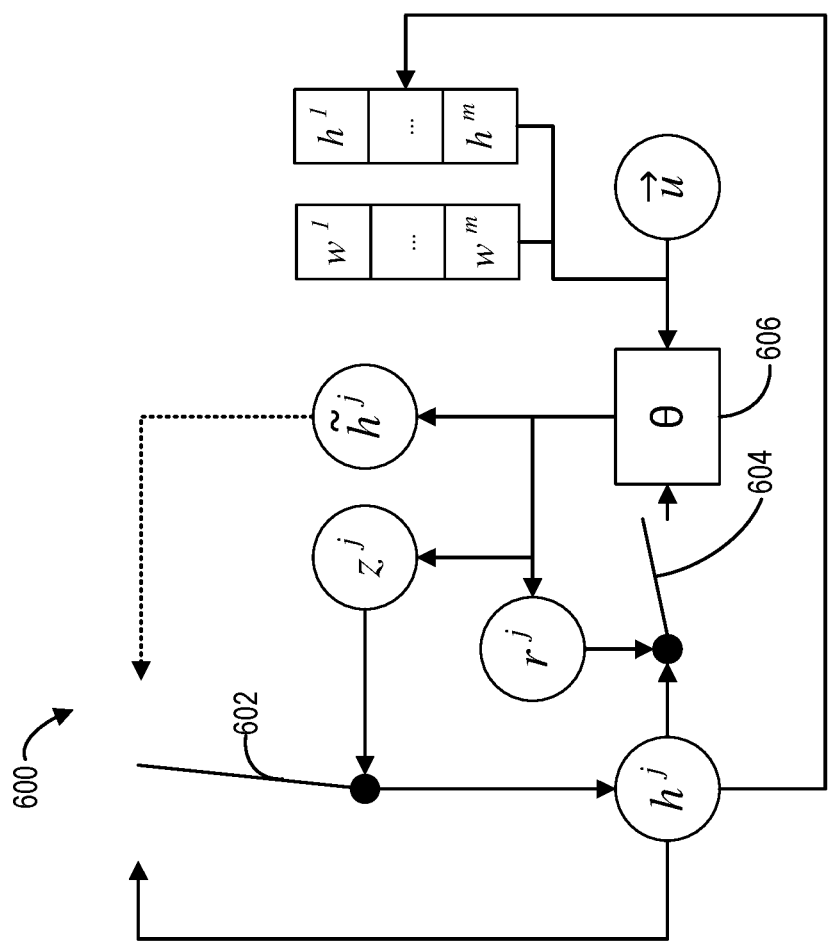
FIG. 6 illustrates a schematic diagram of a dynamic memory unit having cross-slot interaction gates in accordance with one or more embodiments.

As discussed above, the digital state tracking system 102 can also utilize dynamic memory units that consider cross-slot interactions. For instance, the digital state tracking system 102 can utilize cross-slot interaction reset gates and cross-slot interaction update gates that consider interactions between memory slots in applying the respective gating mechanisms. FIG. 6 illustrates a dynamic memory unit 600 with a cross-slot interaction update gate 602 and a cross-slot interaction reset gate 604 in accordance with one or more embodiments. In particular, FIG. 6 illustrates the inputs and functions used by the dynamic memory unit 600 in generating values for the j-th memory slot at the i-th time step where θ represents one or more (update/reset) functions 606 with trainable parameters that analyze the collection of inputs as part of the dynamic memory unit 600. The dynamic memory unit 600 operates similarly to the dynamic memory unit 500 of FIG. 5A except equation 2 and equation 5 are modified as shown below, respectively.

$$z_i^j = \sigma(\Sigma_k \alpha_z^{kj} \vec{u}_i^T w_k + \beta_z^{kj} \vec{u}_i^T h_{i-1}^k) \quad (7)$$

$$r_i^j = \sigma(\Sigma_k \alpha_r^{kj} \vec{u}_i^T w_k + \beta_r^{kj} \vec{u}_i^T h_{i-1}^k) \quad (8)$$

As shown in equation 7, $z_i^j$ represents a cross-slot interaction update value that controls the cross-slot interaction update gate 602. Similarly, as shown in equation 8, $r_i^j$ represents a cross-slot interaction reset value that controls the cross-slot interaction reset gate 604. The coefficients $\alpha_z^{kj}$, $\beta_z^{kj}$, $\alpha_r^{kj}$, and $\beta_r^{kj}$ are parameters trained to provide the correlations between the j-th and the k-th memory slots. As shown by equations 7-8 and FIG. 6, the key vectors [$w^1 \ldots w^m$], and the hidden states [$h^1 \ldots h^m$] of each memory slot contribute to the generation of the current values $h_t^j$ for the j-th memory slot.

As discussed above, after generating current values for each memory slot, the dialog state tracking neural network generates a digital dialog state. Thus, the dialog state tracking system can utilize a dialog state tracking neural network to generate digital dialog states corresponding to segments of digital dialog. The algorithms and acts described with reference to FIGS. 3-6 can comprise the corresponding structure for performing a step for utilizing the dialog state tracking neural network comprising the dynamic memory network to generate a digital dialog state for the dialog segment. Additionally, the neural network architecture and the dynamic memory unit architectures described in relation to FIGS. 3-6 can comprise the corresponding structure for performing a step for utilizing the dialog state tracking neural network comprising the dynamic memory network to generate a digital dialog state for the dialog segment.

Figure 7:
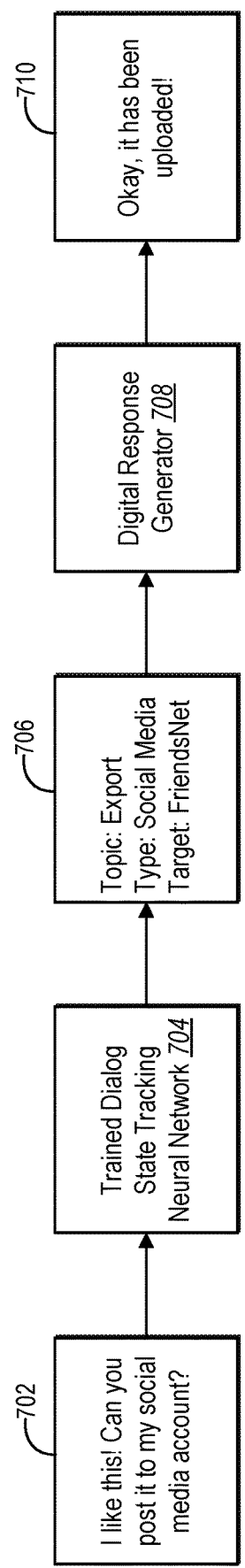
FIG. 7 illustrates a block diagram of the dialog state tracking system generating a response based on a digital dialog state in accordance with one or more embodiments.

Using the generated digital dialog state, the dialog state tracking system can generate a digital response to a current segment of digital dialog. FIG. 7 illustrates a block diagram of the dialog state tracking system generating a digital response to a current segment of digital dialog. As shown in FIG. 7, the dialog state tracking system provides a segment of digital dialog 702 to a trained dialog state tracking neural network 704. In particular, the segment of digital dialog 702 includes a statement followed by an action request. Upon receiving the segment of digital dialog 702, the trained dialog state tracking neural network 704 generates a digital dialog state 706. In particular, the digital dialog state 706 shown in FIG. 7 characterizes the current topic, type, and target of the digital dialog. The dialog state tracking system then provides the digital dialog state 706 to a digital response generator 708, which provides the digital response 710. For example, the digital response generator 708 can utilize natural language generation (e.g., a data-to-text generator) to determine the content, organization, and lexical representation of the digital response 710. Further, the digital response generator 708 can use text-to-speech synthesis (e.g., concatenation synthesis or formant synthesis) to produce an audio representation of the digital response 710. In particular, the digital response 710 includes a statement that the action requested by the segment of digital dialog has been performed. In one or more embodiments, the digital response includes an audio response.

Figure 8:
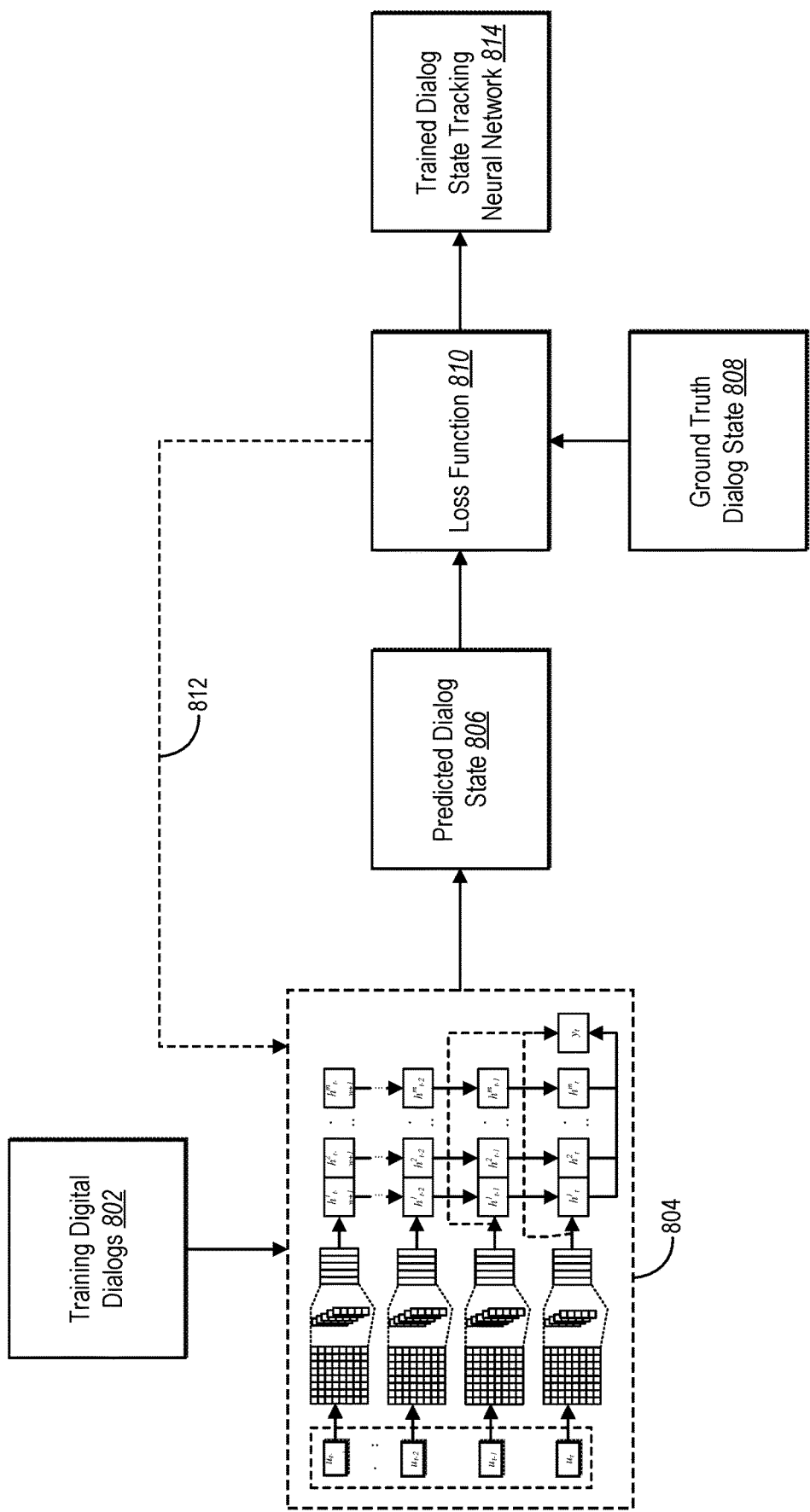
FIG. 8 illustrates a block diagram of training a dialog state tracking neural network to generate digital dialog states in accordance with one or more embodiments.

As mentioned above, the dialog state tracking system utilizes a trained dialog state tracking neural network when generating digital dialog states. FIG. 8 illustrates a block diagram of the dialog state tracking system training a dialog state tracking neural network in accordance with one or more embodiments. As shown in FIG. 8, the dialog state tracking system trains the dialog state tracking neural network 804 using training digital dialogs 802. In particular, each dialog of the training digital dialogs 802 includes a set of training segments. For example, a training digital dialog can include a first training segment and a second training segment.

Further, as shown in FIG. 8, the dialog state tracking neural network 804 includes a dynamic memory network architecture such as the dynamic memory network architecture described with regards to FIGS. 3-6. The dialog state tracking system provides the training digital dialogs 802 to the dialog state tracking neural network 804 and the dialog state tracking neural network 804 generates a predicted dialog state 806. In particular, the dialog state tracking system provides a training segment of a training digital dialog and the dialog state tracking neural network generates a predicted dialog state corresponding to that particular training segment. For example, the dialog state tracking system can provide a first training segment and the dialog state tracking neural network 804 can generate a first predicted dialog state corresponding to the first training segment. Subsequently, the dialog state tracking segment can provide a second training segment and the dialog state tracking neural network 804 can generate a second predicted dialog state corresponding to the second training segment. When generating the predicted dialog state 806, the dialog state tracking neural network 804 processes each training segment in accordance with the processes discussed above with reference to FIGS. 3-6.

As shown in FIG. 8, the dialog state tracking system then compares the predicted dialog state 806 with a ground truth dialog state 808. In particular, the ground truth dialog state 808 provides the true dialog state for the particular training digital dialog after the particular training segment that was most recently processed by the dialog state tracking neural network 804. For example, the ground truth dialog state 808 can include an annotation providing a predetermined state of the training digital dialog after the particular training segment (i.e., an annotation by an administrator of the dialog state tracking system).

As shown in FIG. 8, the dialog state tracking system compares the predicted dialog state 806 to the ground truth dialog state 808 by applying a loss function 810. The loss function 810 determines the cost (i.e., error) resulting from the dialog state tracking neural network 804 based on the difference between an estimated value (i.e., the predicted dialog state 806) and the true value (i.e., the ground truth dialog state 808). The dialog state tracking system can utilize a variety of loss functions, including a squared error loss function, a 0-1 indicator function, a cross entropy loss function, or an L2 loss function.

The dialog state tracking system can train the dialog state tracking neural network 804 based on the determined loss. For example, in one or more embodiments, the dialog state tracking system back propagates the determined loss to the dialog state tracking neural network (as indicated by the dashed line 812) to modify its parameters. In one or more embodiments, the dialog state tracking system modifies the parameters of each layer of the dialog state tracking neural network 804 (e.g., trainable parameters corresponding to the update gates and/or reset gates, such as $W_r$, $W_r$, $\alpha_z^{kj}$, $\beta_z^{kj}$, $\alpha_r^{kj}$, and $\beta_r^{kj}$). Consequently, with each iteration of training, the image relighting system gradually increases the accuracy of the dialog state tracking neural network 804 (e.g., through gradient assent or gradient descent). As shown, the dialog state tracking system can thus generate the trained dialog state tracking neural network 814.

In one or more embodiments, the dialog state tracking system can separately train the embedded convolutional neural network. In particular, the dialog state tracking system can train the embedded convolutional neural network before training the dialog state tracking neural network 804 in a supervised or unsupervised fashion. To illustrate, the dialog state tracking system can train the convolutional neural network to encode digital dialogs based on ground truth data or by utilizing an unsupervised training approach (e.g., autoencoders or an adversarial neural network.)

Thus, the dialog state tracking system can train a dialog state tracking neural network to generate digital dialog states corresponding to segments of digital dialog. The algorithms and acts described with reference to FIGS. 3-6 and FIG. 8 can comprise the corresponding structure for performing a step for training a dialog state tracking neural network comprising a dynamic memory network to generate digital dialog states. Additionally, the neural network architecture and the dynamic memory unit architectures described in relation to FIGS. 3-6 can comprise the corresponding structure for training a dialog state tracking neural network comprising a dynamic memory network to generate digital dialog states.

As mentioned above, using a dialog state tracking neural network with a dynamic memory network architecture, the dialog state tracking system more accurately and efficiently generates digital dialog states, which leads to better digital responses to segments of dialog. Researches have conducted a study to determine the accuracy and effectiveness of one or more embodiments of the dialog state tracking system.

The researchers evaluated six neural network models. In particular, the researchers evaluated three different embodiments of the dialog state tracking system (i.e., an embodiment with dynamic memory units having a single gate, an embodiment with dynamic memory units having both a reset and update gate, and an embodiment with dynamic memory units having cross-slot interaction gates) and three neural network models using other neural network architectures (i.e., CNN, RCNN, and RCNN with GRUs). The embodiment of the dialog state tracking system having the single gate and the embodiment having both the reset and update gate were trained having five memory slots each. The embodiment having the cross-slot interaction gates was trained having ten memory slots.

FIG. 9 illustrates a table reflecting the results of the study. Higher precision (P), recall (R), and F-measure scores indicate better topic prediction, while lower $P_k$ and WindowDiff values indicate more accurate segmentations. The best score for each metric is highlighted in bold face. As shown in the FIG. 9, the various embodiments of the dialog state tracking system outperformed the other neural network models in both topic prediction and segmentation. Notably, each of the improvements in the F-measure metric by the various embodiments of the dialog state tracking system was statistically significant ($p<0.001$). Additionally, the improvements in segmentation were also statistically significant ($p<0.05$) except for the improvement over the CNN model.

As can be seen from the table of FIG. 9, all tested embodiments of the dialog state tracking system resulted in improvements with regards to topic prediction and segmentation accuracy. In particular, the embodiment of the dialog state tracking system having the cross-slot interaction gates resulted in the most improved scores. That embodiment performed better than the other tested models in every metric except recall. In particular, improvements in F-measure passed the statistical significance tests at $p=0.05$ from the other embodiments of the dialog state tracking system and $p=0.001$ from the CNN and RCNN baselines. The differences of the segmentation performances were also significant ($p<0.001$) in both metrics. Thus, the table of FIG. 9 illustrates the improved accuracy of the dialog state tracking system.

Figure 10:
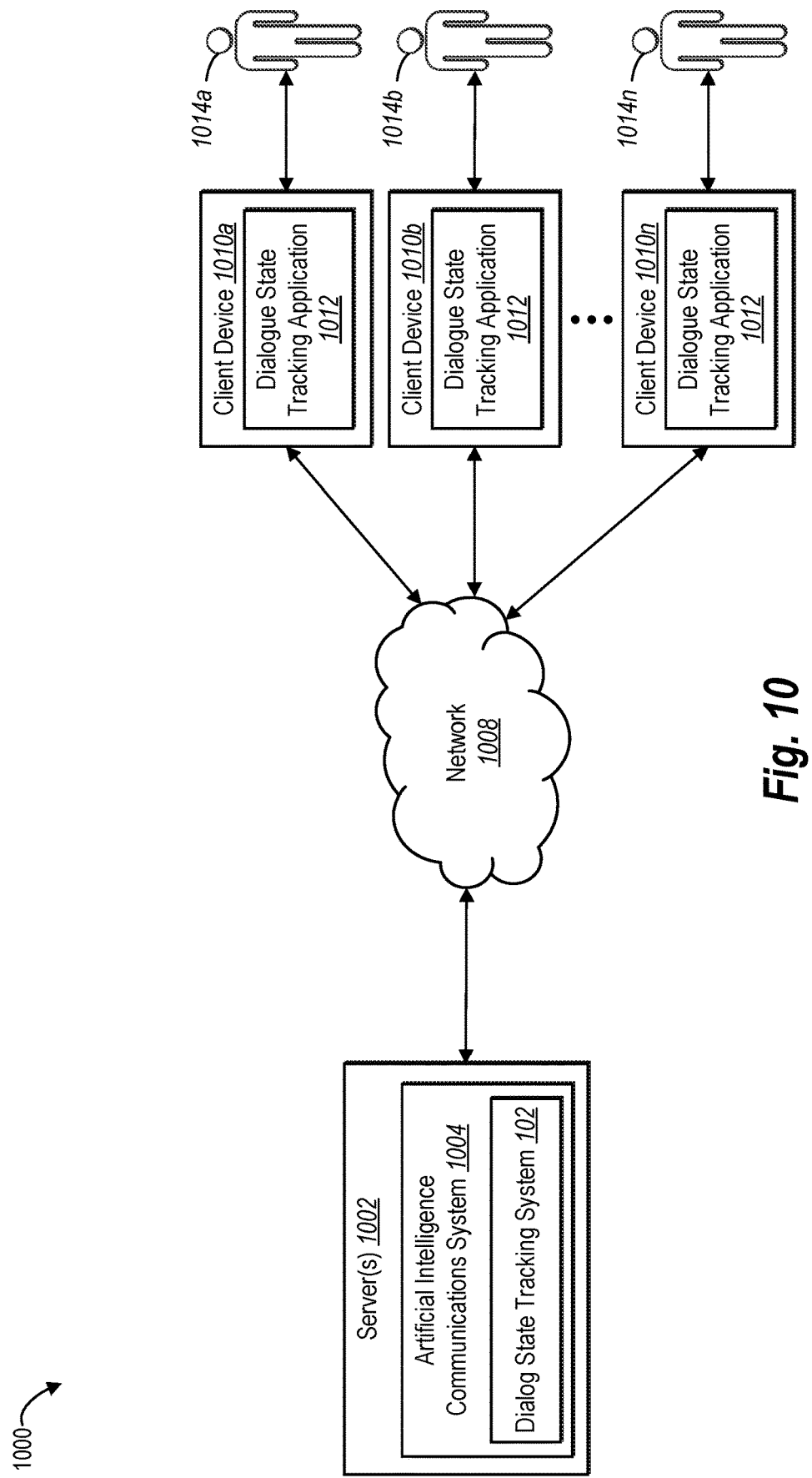
FIG. 10 illustrates an example environment in which a dialog state tracking system can operate in accordance with one or more embodiments.

Turning now to FIG. 10, further information will be provided regarding implementation of the dialog state tracking system. Specifically, FIG. 10 illustrates a schematic diagram of an exemplary system environment ("environment") 1000 in which a dialog state tracking system 102 can be implemented. As illustrated in FIG. 10 the environment 1000 can include a server(s) 1002, a network 1008, client devices 1010a-1010n, and users 1014a-1014n.

Although, FIG. 10 illustrates a particular number of client devices, it will be appreciated that the environment 1000 can include any number of computing devices (few or greater than shown). Similarly, although FIG. 10 illustrates a particular arrangement of the server(s) 1002, the network 1008, the client devices 1010a-1010n, and the users 1014a-1014n, various additional arrangements are possible.

The server(s) 1002, the network 1008, and the client devices 1010a-1010n may be communicatively coupled with each other either directly or indirectly (e.g., through the network 1008, discussed in greater detail below in relation to FIG. 13). Moreover, the server(s) 1002 and the client devices 1010a-1010n may include any type of computing device (including one or more computing devices as discussed in greater detail below in relation to FIG. 13).

As mentioned above, the environment 1000 includes the server(s) 1002. The server(s) 1002 can generate, store, receive, and/or transmit any type of data, including the digital dialogs and digital responses. For example, the server(s) 1002 can receive a segment of digital dialog from the client device 1010a and transmit a digital response back to the client device 1010a. In one or more embodiments, the server(s) 1002 comprises a data server. The server(s) 1002 can also comprise a communication server or a web-hosting server.

As shown in FIG. 10, the server(s) 1002 can include the artificial intelligence communications system 1004. In particular, the artificial intelligence communications system 1004 can perform digital communications functions. For example, the artificial communications system can receive a segment of digital dialog from the user 1014a via the client device 1010a. The artificial intelligence communications system 1004 can subsequently provide the segment of digital dialog to the dialog state tracking system 102 and prepare the resulting digital response for communication back to the user 1014a. In particular, the artificial intelligence communications system 1004 can employ natural language generation and text-to-speech synthesis functionality in preparing the digital response for communication.

Additionally, the server(s) 1002 can include the dialog state tracking system 102. In particular, in one or more embodiments, the dialog state tracking system 102 uses the server(s) 1002 to generate digital responses to segments of digital dialog. For example, the dialog state tracking system 102 can use the server(s) 1002 to receive a segment of digital dialog and then generate a digital response.

For example, in one or more embodiments, the server(s) 1002 can receive a digital dialog that includes various segments of digital dialog. The server(s) 1002 can process a first segment of digital dialog to generate a first digital dialog state and then generate a digital response to the first segment based on the first digital dialog state. The server(s) 1002 can then process a second segment of digital dialog to generate a second digital dialog state and then generate a digital response to the second segment based on the second digital dialog state. In particular, the server(s) 1002 can process each segment of digital dialog to produce a corresponding digital dialog state using a dialog state tracking neural network having a dynamic memory network architecture with a plurality of memory slots and corresponding update and reset gates.

As illustrated by the previous example embodiments, the dialog state tracking system 102 can be implemented in whole, or in part, by the individual elements of the environment 1000. Although FIG. 10 illustrates the dialog state tracking system 102 implemented with regard to the server(s) 1002, it will be appreciated that components of the dialog state tracking system 102 can be implemented in any of the components of the environment 1000. The components of the dialog state tracking system 102 will be discussed in more detail with regard to FIG. 11 below.

In one or more embodiments, the client devices 1010a-1010n include computer devices that allow users of the devices (e.g., the users 1014a-1014n) to send and receive digital communications. For example, the client devices 1010a-1010n can include smartphones, tablets, desktop computers, laptop computers, or other electronic devices. The client devices 1010a-1010n can include one or more applications (e.g., the dialog state tracking application 1012) that allows users 1014a-1014n to send and receive digital communications. For example, the dialog state tracking application 1012 can include a software application installed on the client devices 1010a-1010n. Additionally, or alternatively, the dialog state tracking application 1012 can include a software application hosted on the server(s) 1002, which may be accessed by the client devices 1010a-1010n through another application, such as a web browser.

Figure 11:
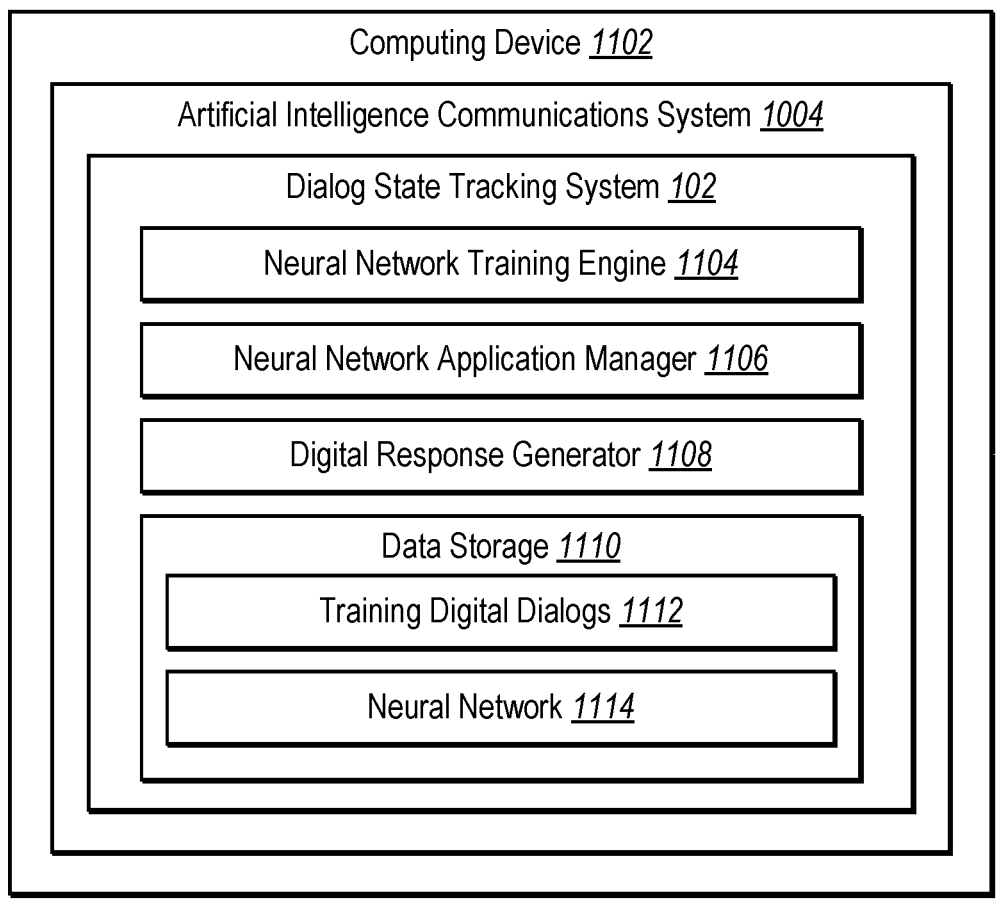
FIG. 11 illustrates an example schematic diagram of a dialog state tracking system in accordance with one or more embodiments

Turning now to FIG. 11, additional detail will be provided regarding various components and capabilities of the dialog state tracking system 102. In particular, FIG. 11 illustrates the dialog state tracking system 102 implemented by the computing device 1102 (e.g., the server(s) 1002 and/or the client devices 1010a-1010n as discussed above with reference to FIG. 10). Additionally, the dialog state tracking system 102 is also part of the artificial intelligence communications system 1004. As shown, the dialog state tracking system 102 can include, but is not limited to, a neural network training engine 1104, a neural network application manager 1106, a digital response generator 1108, and data storage 1110 (which includes the training digital dialogs 1112 and the neural network 1114).

As just mentioned, and as illustrated in FIG. 11, the dialog state tracking system 102 includes the neural network training engine 1104. In particular, the neural network training engine 1104 trains a dialog state tracking neural network to generate digital state dialogs used in generating digital responses to segments of digital dialog. For example, the neural network training engine 1104 trains the dialog state tracking neural network 804 using the training digital dialogs 802 as discussed with reference to FIG. 8.

As show in FIG. 11, the dialog state tracking system 102 also includes the neural network application manager 1106. In particular, the neural network application manager 1106 uses the dialog state tracking neural network trained by the neural network training engine 1104. For example, the neural network application manager 1106 applies a digital dialog to the trained dialog state tracking neural network to generate digital dialog states for each segment of the digital dialog that are used to further generate digital responses to those segments.

Additionally, as shown in FIG. 11, the dialog state tracking system 102 includes the digital response generator 1108. In particular, the digital response generator 1108 generates digital responses that respond to segments of digital dialog. For example, the digital response generator 1108 can utilize the digital dialog states generated by the neural network application manager 1106 to generate the digital responses for each segment of the corresponding digital dialog. For example, the digital response generator 1108 can utilize a first digital dialog state generated by processing a first segment of a digital dialog to produce a first digital response. The digital response generator 1108 can then utilize a second digital dialog state generated by processing a second segment of the digital dialog to produce a second digital response.

Further, as shown in FIG. 11, the dialog state tracking system 102 includes data storage 1110. In particular, data storage 1110 includes training digital dialogs 1112 and neural network 1114. Training digital dialogs 1112 stores a plurality of training digital dialogs that include the sets of training segments. The neural network training engine 1104 can obtain the plurality of training digital dialogs from training digital dialogs 1112 when training the dialog state tracking neural network. The neural network 1114 stores the dialog state tracking neural network trained by the neural network training engine 1104 and applied by the neural network application manager 1106 to generate digital dialog states by processing segments of digital dialog.

The components 1104-1114 and their corresponding elements can comprise software, hardware, or both. For example, the components 1104-1114 and their corresponding elements can comprise one or more instructions stored on a computer-readable storage medium and executable by processors of one or more computing devices. The components 1104-1114 and their corresponding elements can comprise hardware, such as a special purpose processing device to perform a certain function or group of functions. Additionally, or alternatively, the components 1104-1114 and their corresponding elements can comprise a combination of computer-executable instructions and hardware.

Furthermore, the components 1104-1114 of the dialog state tracking system 102 may, for example, be implemented as one or more stand-alone applications, as one or more modules of an application, as one or more plug-ins, as one or more library functions or functions that may be called by other applications, and/or as a cloud-computing model. Thus, the components 1104-1114 of the dialog state tracking system 102 may be implemented as a stand-alone application, such as a desktop or mobile application. Furthermore, the components 1104-1114 of the dialog state tracking system 102 may be implemented as one or more web-based applications hosted on a remote server. Alternatively, or additionally, the components 1104-1114 of the dialog state tracking system 102 may be implemented in a suite of mobile device applications or "apps." For example, in one or more embodiments, the dialog state tracking system 102 can comprise or operate in connection with digital software applications such as ADOBE® SENSEI® or ADOBE® PHOTOSHOP®. "ADOBE," "SENSEI," and "PHOTOSHOP" are either registered trademarks or trademarks of Adobe Systems Incorporated in the United States and/or other countries.

Figure 12:
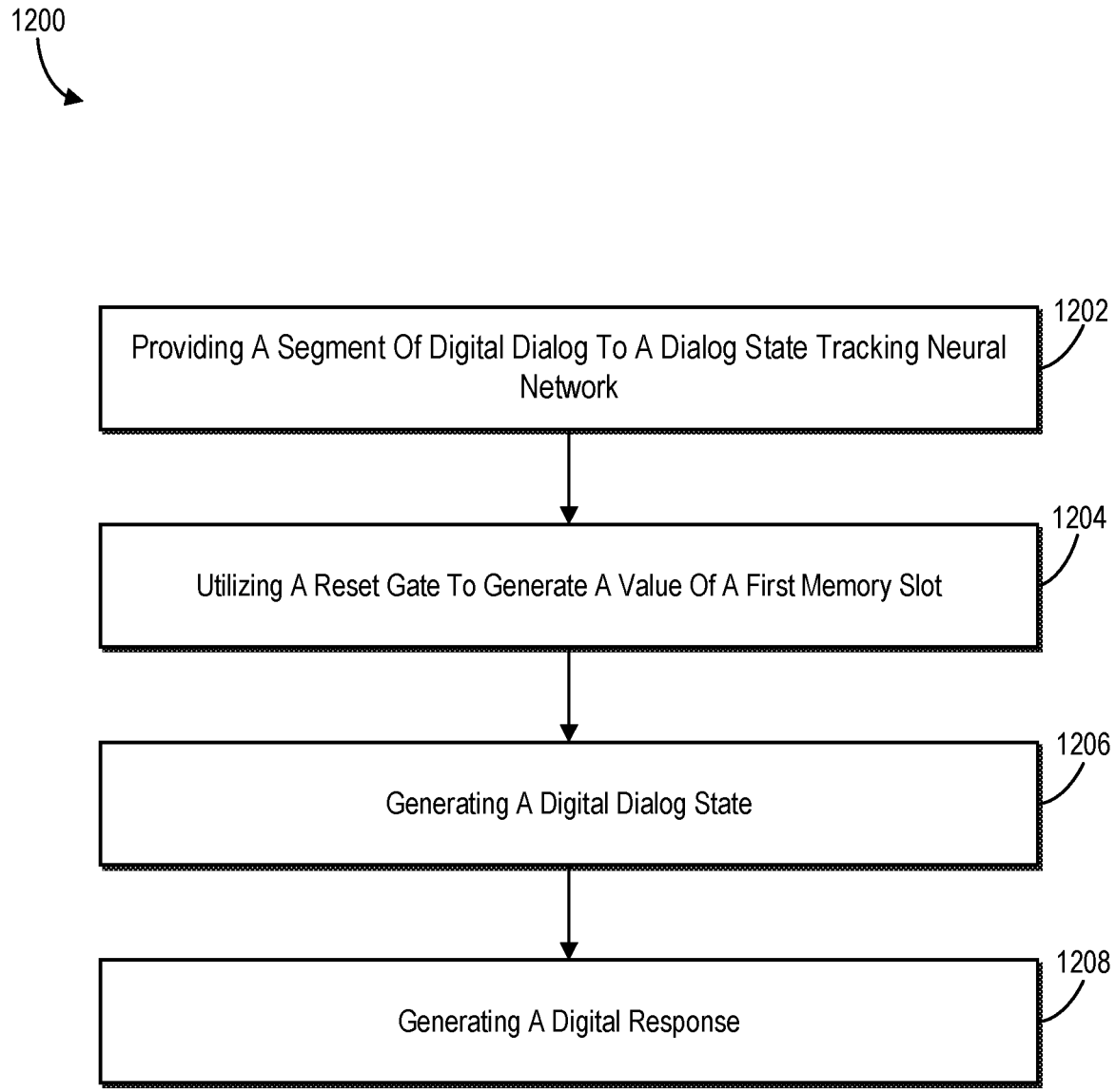
FIG. 12 illustrates a flowchart of a series of acts of generating a response to a segment of digital dialog based on the digital dialog state in accordance with one or more embodiments.

FIGS. 1-11, the corresponding text, and the examples provide a number of different methods, systems, devices, and non-transitory computer-readable media of the dialog state tracking system. In addition to the foregoing, one or more embodiments can also be described in terms of flowcharts comprising acts for accomplishing a particular result, as shown in FIG. 12. FIG. 12 may be performed with more or fewer acts. Further, the acts may be performed in differing orders. Additionally, the acts described herein may be repeated or performed in parallel with one another or parallel with different instances of the same or similar acts.

As mentioned, FIG. 12 illustrates a flowchart of a series of acts 1200 for generating a digital response to a segment of digital dialog based on the digital dialog state in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause a computing device to perform the acts of FIG. 12. In some embodiments, a system can perform the acts of FIG. 12.

The series of acts 1200 includes an act 1202 of providing a segment of digital dialog to a dialog state tracking neural network. For example, the act 1202 involves providing a segment of digital dialog to a dialog state tracking neural network comprising a dynamic memory network having a plurality of memory slots and a plurality of reset gates. In one or more embodiments, the dynamic memory network further comprises a plurality of update gates corresponding to the plurality of reset gates and the plurality of memory slots. One or more embodiments further involve previously identifying the segment of digital dialog by receiving an audio representation of the segment of digital dialog.

The series of acts 1200 also includes an act 1204 of utilizing a reset gate to generate a value of a first memory slot. For example, the act 1204 involves utilizing the dialog state tracking neural network to generate a digital dialog state corresponding to the segment of digital dialog by utilizing a reset gate associated with a first memory slot of the dynamic memory network to generate a value for the first memory slot based on the segment of digital dialog, wherein the value replaces a previous value generated for the first memory slot based on a previous segment of digital dialog. In one or more embodiments, utilizing the reset gate associated with the first memory slot to generate the value comprises determining a reset value and applying the reset value to modify an impact of the previous segment of digital dialog on the value. In one or more embodiments, the reset gate comprises a cross-slot interaction reset gate (i.e., the dialog state tracking neural network comprises a plurality of cross-slot interaction reset gates). In such embodiments, the dialog state tracking system utilizes the reset gate associated with the first memory slot to generate the second value by comparing values of the plurality of memory slots to determine a cross-slot interaction reset value corresponding to the first memory slot and applying the cross-slot interaction reset value to modify an impact of the previous segment of digital dialog on the value.

Some embodiments further involve utilizing an update gate associated with the first memory slot to determine an update value and apply the update value to modify an impact of the segment of digital dialog on the value. Further, in some embodiments, the update gate comprises a cross-slot interaction update gate (i.e., the dialog state tracking neural network further comprises a plurality of cross-slot interaction update gates). In such embodiments, the dialog state tracking system utilizes the update gate associated with the first memory slot to generate the value by comparing values of the plurality of memory slots to determine a cross-slot interaction update value corresponding to the first memory slot and applying the cross-slot interaction update value to modify an impact of the segment of digital dialog on the value.

The series of acts 1200 further includes an act 1206 of generating a digital dialog state. For example, the act 1208 involves utilizing the dialog state tracking neural network to generate the digital dialog state corresponding to the segment of digital dialog by generating the digital dialog state based on the value of the first memory slot. In some embodiments, the digital dialog state comprises at least one of a dialog topic, a location, an entity, or an action.

In one or more embodiments, generating the digital dialog state corresponding to the segment of digital dialog comprises determining that the segment of digital dialog corresponds to a key vector associated with the first memory slot. In such embodiments, utilizing the reset gate associated with the first memory slot to generate the value comprises utilizing the reset gate to generate the value of the first memory slot further based on determining that the segment of digital dialog corresponds to the key vector associated with the first memory slot.

In some embodiments, generating the digital dialog state corresponding to the segment of digital dialog comprises generating a first dialog feature representation by processing the previous segment of digital dialog using one or more convolutional layers of the dialog state tracking neural network and generating a second dialog feature representation by processing the segment of digital dialog using the one or more convolutional layers of the dialog state tracking neural network. In such embodiments, generating the digital dialog state comprises generating the digital dialog state based on the first dialog feature representation, the second dialog feature representation, and the value of the first memory slot. In further embodiments, the dialog state tracking system utilizes the dialog state tracking neural network to generate the digital dialog state corresponding to the segment of digital dialog by utilizing the second dialog feature representation to generate a latent feature vector corresponding to the first memory slot and generating the value of the first memory slot further based on the latent feature vector.

Additionally, the series of acts 1200 includes an act 1208 of generating a digital response. For example, the act 1208 involves generate a digital response to the segment of digital dialog based on the digital dialog state. In one or more embodiments, the digital response to the segment of digital dialog comprises an audio response.

In one or more embodiments, the series of acts 1200 further includes acts for training a dialog state tracking neural network to generate digital dialog states used in generating digital responses to segments in digital dialogs. For example, in one or more embodiments, the dialog state tracking system trains a dialog state tracking neural network comprising a dynamic memory network having a set of memory slots and a corresponding set of cross-slot interaction reset gates to generate digital dialog states used in generating digital responses to segments in digital dialogs by: generating a first set of values for the set of memory slots based on a first training segment of a training digital dialog; applying a cross-slot interaction reset gate based on a comparison of the first set of values for the set of memory slots to generate a second set of values for the set of memory slots; and generating a predicted dialog state for comparison with a ground truth dialog state based on the second set of values for the set of memory slots.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
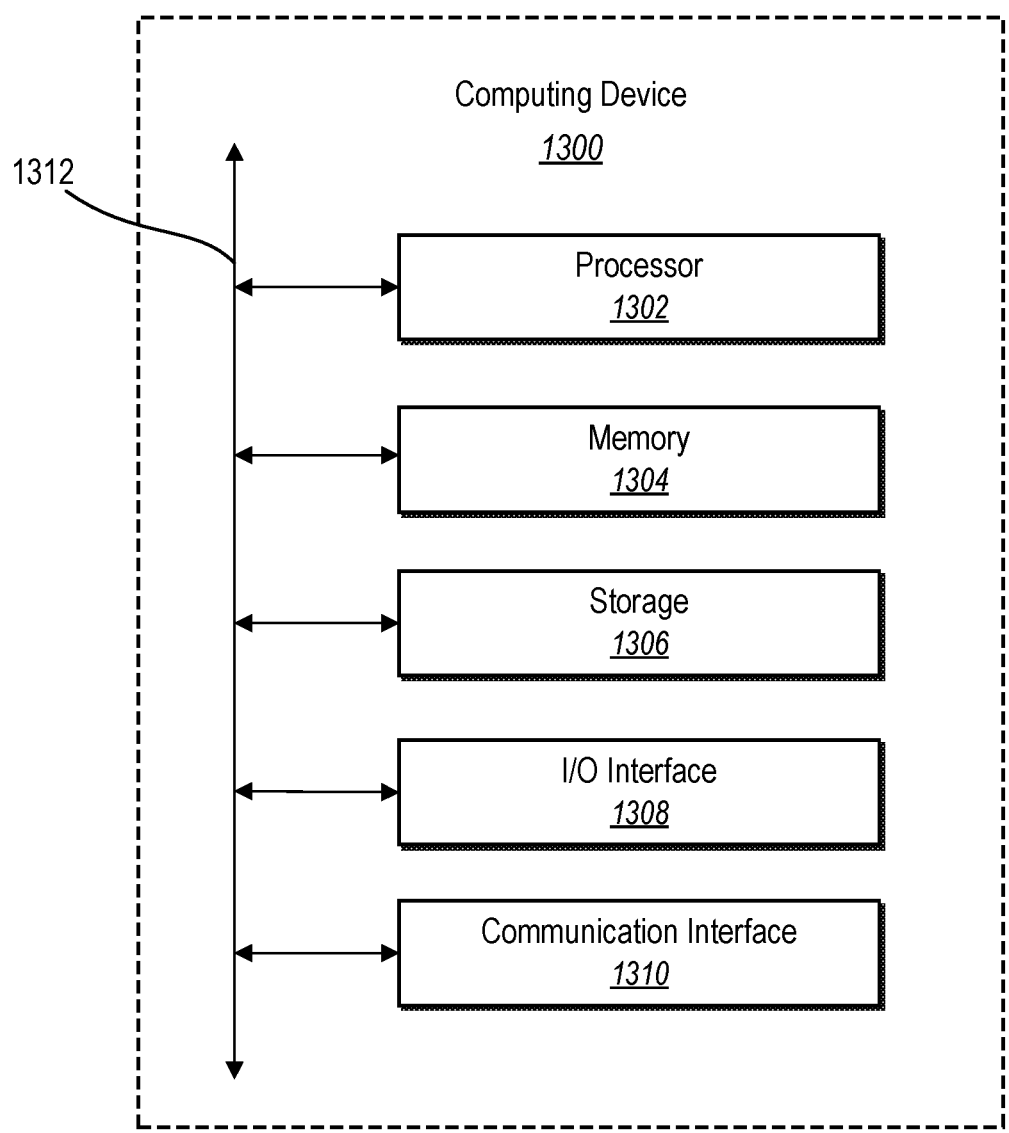
FIG. 13 illustrates a block diagram of an exemplary computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., computing device 1102, the server(s) 1002, and client devices 1010a-1010n). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting.

Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause the at least one processor to perform operations comprising:
   providing a segment of digital dialog to a dynamic memory network comprising a plurality of memory slots, wherein each memory slot corresponds to a designated dialog state characteristic;
   generating, utilizing the dynamic memory network, a digital dialog state for the segment of digital dialog by:
      determining a value corresponding to a first designated dialog state characteristic for a first memory slot from the plurality of memory slots based on the segment of digital dialog; and
      determining the digital dialog state based on the value of the first memory slot that corresponds to the first designated dialog state characteristic; and
   generating a digital response to the segment of digital dialog based on the digital dialog state.

2. The non-transitory computer-readable medium of claim 1, further comprising instructions that, when executed by the at least one processor, cause the at least one processor to perform operations comprising determining a previous value stored in the first memory slot, the previous value corresponding to at least one previous segment of digital dialog,
   wherein determining the value corresponding to the first designated dialog state characteristic for the first memory slot from the plurality of memory slots based on the segment of digital dialog comprises determining the value based on the segment of digital dialog and the previous value stored in the first memory slot.

3. The non-transitory computer-readable medium of claim 1, wherein determining the value corresponding to the first designated dialog state characteristic for the first memory slot comprises determining the value utilizing at least one of a reset gate or an update gate.

4. The non-transitory computer-readable medium of claim 3, wherein determining the value utilizing the at least one of the reset gate or the update gate comprises:
   determining, utilizing a cross-slot interaction reset gate, a cross-slot interaction reset value based on cross-slot interactions between the first memory slot and at least one other memory slot from the plurality of memory slots of the dynamic memory network; and determining the value corresponding to the first designated dialog state characteristic for the first memory slot based on the segment of digital dialog and the cross-slot interaction reset value.

5. The non-transitory computer-readable medium of claim 3, wherein determining the value utilizing the at least one of the reset gate or the update gate comprises:

determining, utilizing a cross-slot interaction update gate, a cross-slot interaction update value based on cross-slot interactions between the first memory slot and at least one other memory slot from the plurality of memory slots of the dynamic memory network; and determining the value corresponding to the first designated dialog state characteristic for the first memory slot based on the segment of digital dialog and the cross-slot interaction update value.

6. The non-transitory computer-readable medium of claim 1, further comprising instructions that, when executed by the at least one processor, cause the at least one processor to perform operations comprising further utilizing the dynamic memory network to generate the digital dialog state for the segment of digital dialog by determining an additional value corresponding to a second designated dialog state characteristic for a second memory slot from the plurality of memory slots based on the segment of digital dialog, the second designated dialog state characteristic different from the first designated dialog state characteristic, wherein determining the digital dialog state based on the value of the first memory slot that corresponds to the first designated dialog state characteristic comprises determining the digital dialog state based on the value of the first memory slot and the additional value of the second memory slot.

7. The non-transitory computer-readable medium of claim 1, wherein determining the value corresponding to the first designated dialog state characteristic for the first memory slot comprises determining the value corresponding to one of a dialog topic, a location, an entity, or an action.

8. The non-transitory computer-readable medium of claim 1, further comprising instructions that, when executed by the at least one processor, cause the at least one processor to perform operations comprising receiving an audio representation of the segment of digital dialog, wherein generating the digital response to the segment of digital dialog comprises generating an audio response comprising the digital response.

9. A system comprising:

at least one memory device; and at least one processor coupled to the at least one memory device that causes the system to perform operations comprising:

providing a segment of digital dialog to a dynamic memory network comprising a plurality of memory slots and a plurality of gating mechanisms, wherein each memory slot is associated with a designated dialog state characteristic and each gating mechanism corresponds to a memory slot;

generating, utilizing one or more neural network layers of the dynamic memory network, a feature vector comprising a representation of the segment of digital dialog;

determining, utilizing the plurality of gating mechanisms of the dynamic memory network, values for the plurality of memory slots by, for a first memory slot:

determining a previous value stored in the first memory slot, the previous value corresponding to a previous segment of digital dialog; and generating, utilizing a gating mechanism corresponding to the first memory slot, a value corresponding to a first designated dialog state characteristic associated with the first memory slot based on at least one of the feature vector for the segment of digital dialog or the previous value stored in the first memory slot;

determining, utilizing one or more additional neural network layers of the dynamic memory network, a digital dialog state based on the values for the plurality of memory slots; and generating a digital response to the segment of digital dialog based on the digital dialog state.

10. The system of claim 9, wherein generating, utilizing the gating mechanism corresponding to the first memory slot, the value corresponding to the first designated dialog state characteristic associated with the first memory slot based on the at least one of the feature vector for the segment of digital dialog or the previous value stored in the first memory slot comprises:

determining, utilizing an update gate of the gating mechanism, an update value; and generating the value for the first memory slot based on the update value and the at least one of the feature vector for the segment of digital dialog or the previous value stored in the first memory slot.

11. The system of claim 10, wherein generating the value for the first memory slot based on the update value and the at least one of the feature vector for the segment of digital dialog or the previous value stored in the first memory slot comprises:

determining an impact of the feature vector for the segment of digital dialog on the value utilizing the update value; and generating the value for the first memory slot utilizing the previous value stored in the first memory slot and the feature vector for the segment of digital dialog based on the impact of the feature vector for the segment of digital dialog.

12. The system of claim 10, wherein generating, utilizing the gating mechanism corresponding to the first memory slot, the value corresponding to the first designated dialog state characteristic associated with the first memory slot based on the at least one of the feature vector for the segment of digital dialog or the previous value stored in the first memory slot comprises:

determining, utilizing a reset gate of the gating mechanism, a reset value; and generating the value for the first memory slot based on the update value, the reset value, and the at least one of the feature vector for the segment of digital dialog or the previous value stored in the first memory slot.

13. The system of claim 12, wherein generating the value for the first memory slot based on the update value, the reset value, and the at least one of the feature vector for the segment of digital dialog or the previous value stored in the first memory slot comprises:

determining an impact of the previous value stored in the first memory slot on the value utilizing the reset value; and generating the value for the first memory slot utilizing the update value, the feature vector for the segment of digital dialog, and the previous value stored in the first memory slot based on the impact of the previous value stored in the first memory slot.

14. The system of claim 9, wherein generating, utilizing the gating mechanism corresponding to the first memory slot, the value corresponding to the first designated dialog state characteristic associated with the first memory slot based on the at least one of the feature vector for the segment of digital dialog or the previous value stored in the first memory slot comprises:

determining, utilizing a cross-slot interaction update gate of the gating mechanism, a cross-slot interaction update value;

determining, utilizing a cross-slot interaction reset gate of the gating mechanism, a cross-slot interaction reset value; and generating the value for the first memory slot based on the cross-slot interaction update value, the cross-slot interaction reset value, and the at least one of the feature vector for the segment of digital dialog or the previous value stored in the first memory slot.

15. The system of claim 14, wherein:

determining, utilizing the cross-slot interaction update gate of the gating mechanism, the cross-slot interaction update value comprises determining the cross-slot interaction update value based on correlations between the first memory slot and other memory slots from the plurality of memory slots of the dynamic memory network; and determining, utilizing the cross-slot interaction reset gate of the gating mechanism, the cross-slot interaction reset value comprises determining the cross-slot interaction reset value based on the correlations between the first memory slot and the other memory slots from the plurality of memory slots of the dynamic memory network.

16. The system of claim 9, wherein:

the at least one processor further causes the system to perform operations comprising determining a key vector associated with the first memory slot, the key vector comprising learned parameters for the first memory slot; and generating the value corresponding to the first designated dialog state characteristic associated with the first memory slot based on the at least one of the feature vector for the segment of digital dialog or the previous value stored in the first memory slot comprises generating the value based on the key vector and the at least one of the feature vector for the segment of digital dialog or the previous value stored in the first memory slot.

17. A computer-implemented method comprising:

providing a segment of digital dialog to a dynamic memory network comprising a plurality of memory slots, wherein each memory slot corresponds to a designated dialog state characteristic;

generating, utilizing the dynamic memory network, a digital dialog state for the segment of digital dialog by:
determining a value corresponding to a first designated dialog state characteristic for a first memory slot from the plurality of memory slots based on the segment of digital dialog; and
determining the digital dialog state based on the value of the first memory slot that corresponds to the first designated dialog state characteristic; and generating a digital response to the segment of digital dialog based on the digital dialog state.

18. The computer-implemented method of claim 17, further comprising:

providing a subsequent segment of digital dialog to the dynamic memory network;

generating, utilizing the dynamic memory network, a subsequent digital dialog state for the subsequent segment of digital dialog by:
determining an additional value corresponding to the first designated dialog state characteristic for the first memory slot based on the segment of digital dialog and the subsequent segment of digital dialog; and
determining the subsequent digital dialog state based on the additional value of the first memory slot that corresponds to the first designated dialog state characteristic; and generating a subsequent digital response to the subsequent segment of digital dialog based on the subsequent digital dialog state.

19. The computer-implemented method of claim 17, further comprising replacing a previous value stored in the first memory slot with the value determined for the first memory slot.

20. The computer-implemented method of claim 17, further comprising receiving a textual representation of the segment of digital dialog, wherein generating the digital response to the segment of digital dialog comprises generating a textual response comprising the digital response.

* * * * *